United States Patent [19]
Lau

[11] Patent Number: 6,052,373
[45] Date of Patent: Apr. 18, 2000

[54] FAULT TOLERANT MULTICAST ATM SWITCH FABRIC, SCALABLE SPEED AND PORT EXPANSION CONFIGURATIONS

[76] Inventor: Peter S. Y. Lau, 1330 Rue St. Louis, St. Laurent, Quebec, Canada, H4L 2P3

[21] Appl. No.: 08/726,754

[22] Filed: Oct. 7, 1996

[51] Int. Cl.[7] .............................. H04L 12/28; H04L 12/56
[52] U.S. Cl. .......................... 370/399; 370/397; 370/387; 370/414; 370/390
[58] Field of Search ..................................... 370/395, 413, 370/398, 390, 411, 414, 360, 366, 387, 380, 397, 218, 399

[56] References Cited

U.S. PATENT DOCUMENTS

| | | | |
|---|---|---|---|
| 5,130,984 | 7/1992 | Cisneros | 370/399 |
| 5,355,372 | 10/1994 | Sengupta et al. | 370/387 |
| 5,402,415 | 3/1995 | Turner | 370/60 |
| 5,459,724 | 10/1995 | Jeffrey et al. | 370/398 |

OTHER PUBLICATIONS

P. C. Wong and M. S. Yeung, "Design and Analysis of a Novel Fast Packet Switch—Pipeline Banyan," IEEE/ACM Trans. on Networking, vol. 3, No. 1, pp. 63–69, Feb. 1995.
Y. S. Su and J. H. Huang, "Throughput Analysis and Optimal Design of Banyan Switches with Bypass Queuues," IEEE Trans. on Comm., vol. 42, No. 10, pp. 2781–2784, Oct. 1994.
K Y. Eng, M. J. Karol, and Y. S. Yeh, "A Growable Packet (ATM) Switch Architecture: Design Principles and Applications," IEEE Trans. on Comm., vol. 40, No. 2, pp. 423–430, Feb. 1992.

Primary Examiner—Michael Horabik
Assistant Examiner—Kevin C. Harper

[57] ABSTRACT

A fault tolerant multicast ATM switch fabric is constructed as a multistage interconnection network through which cells move from input to output along a pre-established data path. The control phase proceeds concurrently with the data phase by which cells move continuously without idle clock cycles in between. The control logic resolves the state of the switching elements and sends this state information to the data path logic ahead of the cell transfer. The switch consists of three IC designs: control, data path, and switch port controller ICs. The successful realization of the switch relies critically on the design of the control IC which incorporates a new combinatorial hardware design running a dedicated algorithm. A switch port controller delegates, based on local decisions, the replication and routing of multicast cells to a selected group of switch port controllers on a per call basis, thereby supporting any multicast group in a unified manner. The ATM cell switch fabric includes a protection control IC for providing a 1+1 protection and a protection data path IC for providing a 1:m protection. A large scale cell switch fabric is constructed in which a first stage switch distributes its incoming traffic, destined for the same output switch and on a per call basis, evenly over multiple routing switches in a 2-stage or higher configuration. A higher switching speed is achieved in which a source switch port controller distributes its incoming traffic, on a per call basis, evenly over multiple cell switches.

18 Claims, 18 Drawing Sheets

| CELL TYPE | DESCRIPTION |
|---|---|
| 0 | UNICAST CELL |
| 1 | MULTICAST CELL |
| 2 | MULTICAST-I CELL RECEIVED OVER THE SWITCH RECEIVE PATH. THE CELL CONTAINS THE MULTICAST CELL PAYLOAD BEING SENT TO A SPC FOR REPLICATION |
| 3 | MULTICAST-II CELL RECEIVED OVER THE SWITCH RECEIVE PATH. THE CELL CONTAINS THE CELL HEADER AND THE MULTICAST SUBGROUP DESTINATIONS BEING SENT TO THE SPC THAT HAS RECEIVED THE ASSOCIATED MULTICAST-I CELL |
| 4 | FAULT DETECTION CELL FOR DETECTING FAULTS IN THE DATA PATH ICS |

FIG. 3

| SUB-GROUP NUMBER | BIT POSITION | | 0 1 2 3 4 5 6 7 8 9 10 11 12 13 14 15 16 17 18 19 20 21 22 23 24 25 26 27 28 29 30 31 | |
|---|---|---|---|---|
| | 5-BIT SIZE | 5-BIT OFFSET | 5-BIT SPC # | 32-BIT SEQUENCE (N=32) REPRESENTING A MULTICAST GROUP |
| 1 | 01011 | 00000 | 00001 | 0 1 1 1 0 0 1 0 0 0 1 1 1 1 1 0 0 1 0 0 1 0 1 1 0 0 1 1 1 0 0 0 | 11 - bit sequence |
| 2 | 01011 | 01011 | 01011 | | 11 - bit sequence |
| 3 | 01010 | 10110 | 10111 | | 10 - bit sequence |

FIG. 5 ackU = UPPER ACKNOWLEDGMENT
ackL = LOWER ACKNOWLEDGMENT actU = UPPER ACTIVITY BIT
actL = LOWER ACTIVITY BIT
DiU = UPPER I$^{th}$ DESTINATION BIT
DiL = LOWER I$^{th}$ DESTINATION BIt

| NUMBER OF MIN PLANES | Total Output Buffer Size | | | | | | | | | | | | | |
|---|---|---|---|---|---|---|---|---|---|---|---|---|---|---|
| | 1 | 2 | 3 | 4 | 5 | 6 | 8 | 10 | 12 | 16 | 20 | 24 | 100 | 256 |
| 1 | 29% | - | - | - | - | - | - | - | - | - | - | - | - | - |
| 2 | - | 54% | - | - | - | - | - | - | - | - | - | 56% | 56% | - |
| 3 | - | - | 72% | - | - | 77% | - | - | 79% | - | - | 80% | - | - |
| 4 | - | - | - | 82% | - | - | 86% | - | - | 90% | - | - | - | 94% |
| 5 | - | - | - | - | 87% | - | - | 91% | - | - | 93% | - | 98% | - |

FAULT TOLERANT MULTICAST ATM SWITCH FABRIC, SCALABLE SPEED AND PORT EXPANSION CONFIGURATIONS

FIELD OF THE INVENTION

This invention relates to an ATM switching system that addresses the scalability, high capacity, multicast, fault-tolerance, and low hardware complexity requirements of ATM cell switching networks.

DESCRIPTION OF PRIOR ART

One classification of an NxN switch is by the queueing strategies: input queueing, internal queueing, and output queueing. While input queueing is simple to construct and scalable, it suffers from head-of-line (HOL) blocking that impedes the maximum utilization to 58%. While output queueing attains high utilization, it is difficult to scale because of the high degree of connectivity required between input and output, or because of the limited bandwidth shared bus. Internal queueing stores cells in the intermediate stage buffers and is less attractive because of the complexity, scalability and low utilization problems.

The Multistage Interconnection Network (MIN) based self-routing switches have received much attention and are well understood. A MIN, however, suffers not only from HOL blocking but also internal blocking, resulting in utilization as low as 25%. Numerous research papers have addressed this issue out of which the major techniques for overcoming the shortcomings are: parallel switch planes where cells traverse to reach an output port simultaneously, bypass queueing where cells queued behind HOL vie for output ports, dilation where cells travel over parallel path connecting two Switching Elements (SEs) in adjacent stages. The paper entitled "Throughput Analysis and Optimal Design of Banyan Switches with Bypass Queues" by Su et al. in IEEE Trans. Comm., vol. 42, October 1994 analyzed the performance of banyan switches with bypass queueing and parallel switch planes which shows considerable throughput improvement. The method of applying bypass queueing, however, incurs overhead that counteracts the throughput gain. Many performance studies underestimated or ignored the overhead, making the performance figures overly optimistic.

This invention will express the control overhead explicitly in real time instead of the relative bit time as was used in the studies. The method of applying parallel switch planes is uneconomical since it increases chip count by many times.

In another paper entitled "Design and Analysis of a Novel Fast Packet Switch—Pipeline Banyan" by Wong et al. in IEEE/ACM Trans. Networking, vol. 3, No. 1, February 1995, input cells are distributed to multiple external banyan switch planes to achieve near 100% utilization. Instead of including the control logic within each switch plane, a single control plane was used to determine the states of the SEs which are sent to the switch planes, over $$\frac{N}{2}\log_2 N$$

pins, in a round robin manner. The drawbacks of this method are the high pin count required for sending the state values from the control plane to the switch planes and the high chip count for achieving high utilization.

Multicast refers to an end system sending the same information to a selected group of destination end systems, also know as point-to-multipoint. Numerous research papers have addressed this issue out of which the major techniques are: a copy network for replicating cells as they pass through it before entering a point-to-point switch, a MIN having a built-in copy capability by setting the SEs appropriately to broadcast modes, a point-to-point switch having a cell recycling capability. In U.S. Pat. No. 5,402,415, issued Mar. 28, 1995 (Turner), a multicast virtual circuit switch using cell recycling is described in which cells are replicated by 2 each time they are recycled through the switch. Cells to be replicated are identified by the assigned VCI with which the input port looks up its table to assign two new (output, VCI) pairs and send them through the switch fabric. In this method, the entries in the look-up tables need to be set up prior to cell recycling. The setup and release of the look-up entries are cumbersome and inflexible.

Fault tolerance of switch fabrics is a primary requirement in a highly reliable environment such as in public and mission critical switching applications. The ability of a switch fabric to recover automatically and responsively from faults minimizes down time. The need for fault tolerance of a switch fabric grows with the capacity of the switch fabric because a failed switch fabric brings down a high volume of traffic flowing through it. The most common approach to fault tolerance is the provision of a redundant switch fabric which takes over the failed one automatically with or without service interruption. This approach is acceptable in small switches where a switch fabric can be accommodated in a single board, but becomes costly in large switches where a switch fabric may be divided into several boards. It is more economical and robust to build fault tolerance into a switch fabric rather than to use a redundant switch fabric.

Achieving a scalable ATM switch fabric having thousands or even millions of input/output ports is a major goal in offering an ATM network. Numerous research papers have addressed this issue out of which the only approach is to interconnect a large number of small Component Switch Fabrics (CSFs) to construct a large scale switch fabric. The CSFs can be of any type such of input queueing or output queuing. The inevitable fact is that more than k NxN CSFs are required to achieve a kNxkN switch fabric. Examples of interconnection topology are nonblocking three-stage Clos network, blocking multistage interconnection network. The drawbacks of these approaches are: the resulting performance is inferior to an individual CSF, the number of required CSFs is large, CSFs have unequal number of input and output lines, the cell sequence integrity cannot be maintained, etc.

In the paper entitled "A Growable Packet (ATM) Switch Architecture: Design Principles and Applications" by Eng et al. in IEEE Trans. Comm., vol. 40, February 1992, a three-stage interconnection network was proposed to construct a kNxkN switch fabric where the first stage consists of k NxM CSFs, the second stage consists of M kxk CSFs, and the third stage consists of k MxN knockout CSFs, where M is between 2 to 3 times that of N. The drawbacks of this switch architecture are: the extra hardware for daisy-chaining the first stage CSFs, the long cell scheduling time, the large required number of CSFs, three times as many the output (input) lines as the input (output) lines in the first (third) stage CSFs, packet can be dropped within the system especially with hot spot input traffic where cells tend to concentrate to a few output ports.

SUMMARY OF THE INVENTION

This invention constructs an ATM cell switch fabric featuring simplicity, scalability and high utilization. Simplicity takes the advantage of modest complexity parallel MIN structure, and stems from the use of only local decisions by the Switch Port Controllers (SPCs) to perform multicasting, to detect the existence of SPCs, and to participate in attaining fault tolerance. Scalability stems from the separation of the control and data path logics and the method of interconnecting CSFs to build a large scale ATM cell switch fabric. High utilization stems from bypass queueing, internal parallel data planes, input buffering and output buffering.

More specifically, the transfer of cells is through a parallel of identical data planes each of which comprises parallel MINs with the state of SEs determine the physical paths leading from input to output. Prior to transferring cells across the parallel data planes, a control plane accepts the requests from the SPCs in order to set up the states of the parallel MINs of the parallel data planes, and does so concurrently with the cell transfer. The request made by a SPC is represented by a bit sequence consisting of the destination output port number will be referred to as Control Header (CH). The time the control plane takes to set up the state of the SEs of the parallel MINs will be referred to as control time. So long as the control time is within the cell transfer time (for example 170 ns for OC-48 rate), it incurs no overhead.

The control plane uses bypass queueing to allow cells queued behind HOL cells to contend for output ports so that cells granted output ports in a particular pass traverse one MIN of the parallel MINs of a data plane and over a parallel of data planes. The control plane comprises a single MIN which is time shared to enable multiple contention resolution passes for the same set of requests in order to achieve bypass queueing. The MIN of the control plane has parallel internal paths connecting adjacent SEs so that entire CHs propagate from one stage SEs to the next. Furthermore, the control plane accelerates the control process by realizing combinatorial control paths consisting of combinatorial SEs over which CHs propagate from input to output.

Each of the data planes of the parallel data planes provides a 1-bit (or more) data path for cell transfer and is implemented in one IC. The resulting single IC implementation will be referred to as data path IC. The control plane is also implemented in one IC and will be referred to as control IC.

This invention includes one protection control IC and one protection data path IC for providing fault tolerance to the system. The SPCs periodically send and receive special cells to each other for serving as the heart beat of the SPCs, for determining if a fault has been developed and on which data path ICs or control IC so as to switch away from the faulty IC to the protection IC. This invention leverages the underlying external physically separate parallel data path ICs architecture to efficiently protect the system from failure at a fractional cost of the original system in that one standby data path IC protects all other data path ICs and does so autonomously by the participating SPCs.

This invention uses cell recycling to achieve multicasting in which the source SPC, that receives a multicast cell, delegates cell copying based on local decision only without the need of pre-establishing the lookup tables in each cell recycling nodes. More specifically, the source SPC partitions a multicast group into subgroups and selects a member from each subgroup to sequentially replicating the multicast cell and sending to all the destinations contained in the subgroup.

This invention constructs a large scale ATM cell switch fabric by interconnecting CSFs in a two or more stage arrangement. A CSF in the first stage connects to every CSF in the second stage via one or more of its output lines. This implies that a CSF in the second stage connects to all of the CSFs in the first stage. Congestion will occur when the total offered load to a second stage CSF that is destined for a first stage CSF exceed the line capacity between the two CSFs. This invention solves this problem by distributing the incoming traffic to a first stage CSF in such a way that congestion will not occur in the second stage CSFs and at the same time maintain cell sequence integrity. That is the total offered load to a second stage CSF destined for a first stage CSF will not exceed the line capacity between the two CSFs, and the cells belonging to a call will leave the system in the same order as the they arrived to the system.

This invention increases the port speed using parallel identical switch planes connecting to a SPC. which distributes traffic evenly among the switch planes on a per call basis in order to preserve cell sequencing.

OBJECTS AND ADVANTAGES

The objects and advantages of the present invention are:
(a) to provide an ATM cell switch fabric that is scalable in port count and port speed, fault tolerant, of low hardware complexity and low chip count, and practical to implement;
(b) to provide an efficient and flexible multicast capability to the ATM cell switch fabric in this invention or in other switch architectures;
(c) to provide a large scale ATM cell fabric having 100% utilization by interconnecting a plurality of identical small cell switch fabrics in this invention or by interconnecting a plurality of other switch fabrics;
(d) to provide an ultra high port speed to meet any future switch fabric throughput requirement.

The major advantage provided by this invention is the seamless integration of the above objects to provide a virtually unlimited modular growability, fault tolerant, cost effective, high speed multicast ATM cell switching network having a port count from a few tens to in over a billion and a bandwidth from a few Gbps to in excess of Pbps ($10^{15}$, peta bits per second).

BRIEF DESCRIPTION OF THE DRAWINGS

FIG. 3 is a table showing the cell type values and their use.

FIG. 5 is an example of multicast group partitioning.

DETAILED DESCRIPTION OF THE PREFERRED EMBODIMENTS OF THE INVENTION

Figures 1, 2:
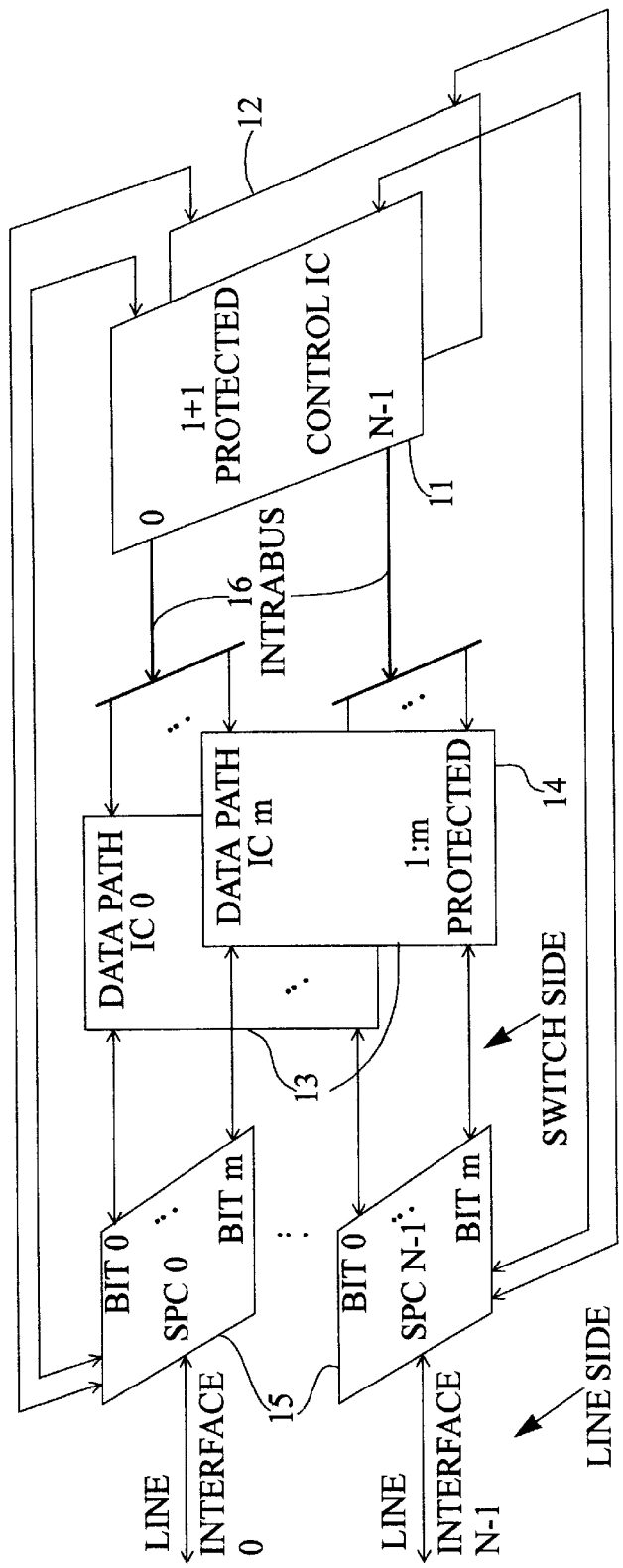
FIG. 1 is a diagram of the switch architecture comprising three distinctive components, namely, switch port controllers, control IC, and data path ICs.
FIG. 2 is an illustration showing the format of the control header.

FIG. 1 is a diagram of the N×N switch architecture which comprises a working control IC 11, a protection control IC 12 for a 1+1 protection, m data path ICs 13 each of which supports one (or more) data bit per port, a protection data path IC 14 for a 1:m protection, and N SPCs 15 (a single IC may support one or more SPCs). Each cell time the working control IC 11 accepts from each SPC 15 a control header (CH) with which it resolves output port contention, sets up the data path, acknowledges the SPCs 15, and propagates the setup information to the data path ICs 13 over the IntraBus 16. The protection control IC 12 will take over the working control IC 11 in case faults are detected in the working control IC 11. A SPC 15 sends a CH to and receives an acknowledgment from the working control IC 11, and sends a cell to and receives a cell from the data path ICs 13. If the acknowledgment is positive, the SPC 15 will emit the cell to the data path ICs 13; otherwise it will send a null cell. On receiving a cell, a SPC 15 will discard any null cell. A data path IC 13 sets up its internal path using the setup information received on the IntraBus 16, receives and buffers active cell bits from the source SPCs 15, and sends cell bits to the destination SPCs 15. If faults are developed in one of the m data path ICs 13, the SPCs 15 will detect that fault and switch to the protection data path IC 12.

FIG. 2 shows the format of the CH. The activity bit indicates if the cell, received on the switch side, is active or null: a '0' indicates an active cell and a '1' indicates a null cell, the $d_{n-1}, d_{n-2}, \ldots, d_0$ bits represent the destination SPC number.

IntraBus

The IntraBus is an N-bit unidirectional bus, connecting the control IC to the data path ICs, over which the state values move from the control IC to the data path ICs. It should be appreciated that the IntraBus width may vary according to the requirement. In particular two bits of the IntraBus carry state values from one row of SEs in the control IC MIN to the same row of SEs in a data path IC MIN. For example, an OC-48 128×128 switch would require an IntraBus bit to shift 4 bits in 40 ns, that is at 100 MHz which is well within today's technology.

SPC Unicasting

Figure 4:
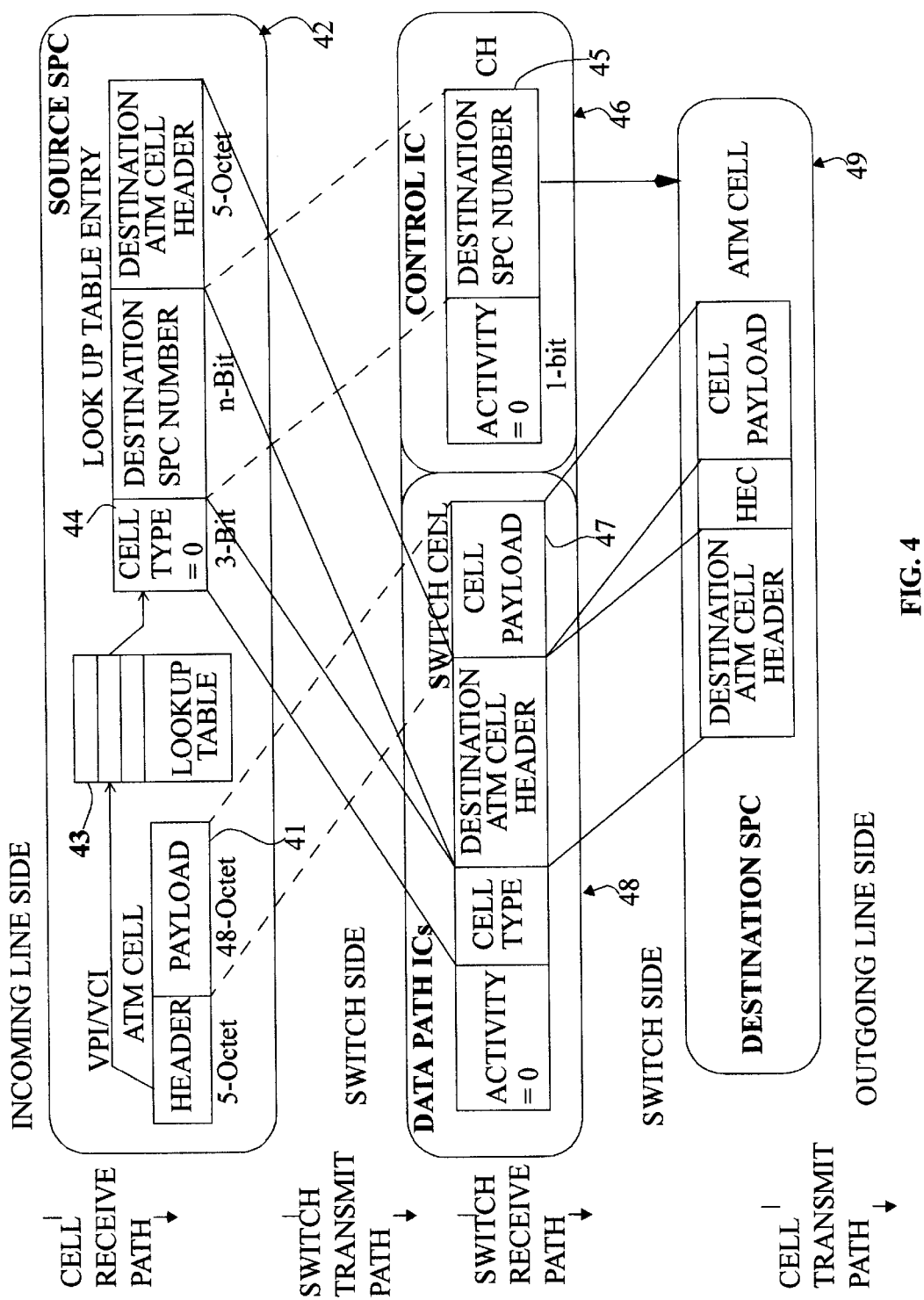
FIG. 4 is an illustrative diagram explaining the concept of unicast switching.

A SPC interfaces to and serves one port of the N×N ATM cell switch fabric with a total of N such SPCs. FIG. 4 shows the unicast switching process. In the cell receive path, after receiving a unicast cell 41 from a line device over a bus, the source SPC 42 uses the VPI/VCI in the unicast cell as an index into a Unicast Look Up Table (LUT) 43 to retrieve an entry 44 containing a 3-bit cell type value identifying the different types of cells exchanged between SPCs, a 5-octet header for replacing the one in the unicast cell to form the proper destination cell, and a n-bit (n=log$_2$N) destination SPC number to which the proper destination cell is sent. The table in FIG. 3 assigns different cell type values to cells serving different purposes. Cell type values of 0, 1, 2, 3, 4 represent a unicast, multicast, multicast-I, multicast-II, and fault detection cell respectively which will be described in details in the following sections.

With the looked up entry, the source SPC formats a CH 45 which comprises a '0' activity bit and the n-bit destination SPC number, and sends it to the control IC 46 for contention resolution and path setup. After receiving a positive acknowledgment from the control IC 46, the source SPC 42 assembles a switch cell 47 containing a '0' activity bit, a '0' cell type, and the proper destination cell, and sends it to the data path ICs 48 on the switch transmit path.

In the switch receive path, after receiving a switch cell from the data path ICs, a destination SPC 49 strips off the activity bit and cell type to recover the proper destination cell and transmits it to the external device in the cell transmit path.

SPC Multicasting

Individual SPC makes local decisions as to how multicasting is conducted. During a multicast call setup, the SPC receiving the multicast call first identifies all of the destination SPCs to which cells belonging to the multicast call are sent. The set of destination SPCs of a multicast call is referred to as a multicast group. To facilitate multicasting, the SPC partitions the multicast group into multicast subgroups whose size are determined at call set up time based on delays and other applicable criteria. The call setup procedure then assigns a single cell header to each multicast subgroup such that cells addressing to the same multicast subgroup SPCs would share the same assigned cell header when departing the ATM cell switch fabric for the next switching node or end user equipment. In other words, at call setup time, the source SPC selects a common available VPI/VCI number from each of the destination SPCs contained in a multicast subgroup in order to avoid the address translation by the destination SPCs.

An N-bit sequence is sufficient to represent any multicast group in that a bit '1' in the i$^{th}$ position signifies that the i$^{th}$ SPC is one of the destinations of a multicast cell. For example, if a multicast request to an 8×8 ATM cell switch fabric is (00100011), then the corresponding multicast cell will be replicated and sent to destination SPCs 0, 1, and 5 respectively. It is also necessary to use N bits to represent a multicast group. The prove for the 'necessary' part is by enumerating all possible multicast patterns. For a multicast cell addressing to k destination SPCs, the number of different k-destination multicast patterns is $$\binom{N}{k}.$$

The total number of multicast patterns is the sum of all destination patterns, that is $$\sum_{k=0}^{N}\binom{N}{k}=2^N.$$

Clearly, N bits are required to represent a multicast request.

Figure 6A:
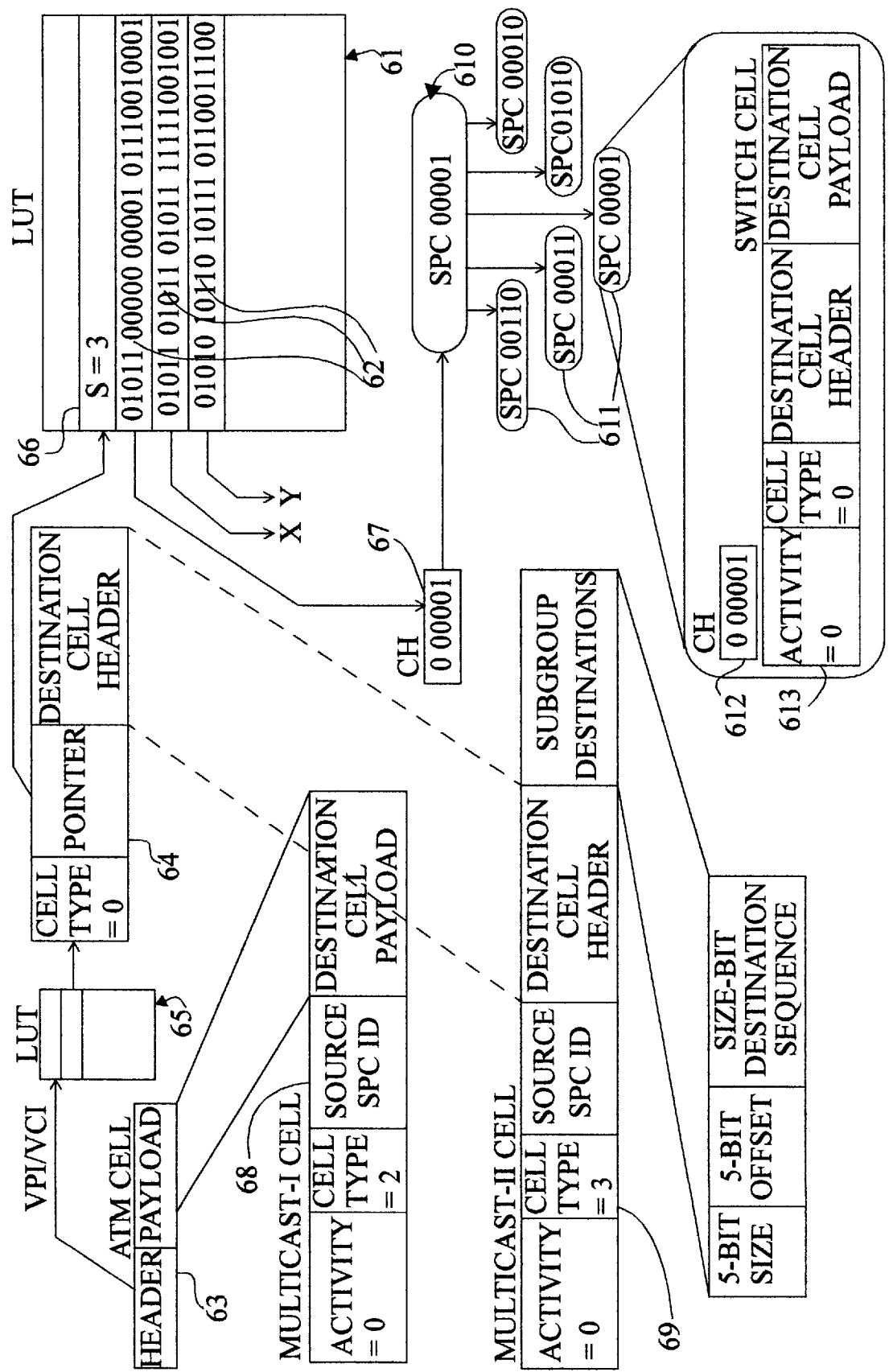
FIG. 6a and FIG. 6b are an illustrative diagram explaining the concept of multicast switching.
Figure 6B:
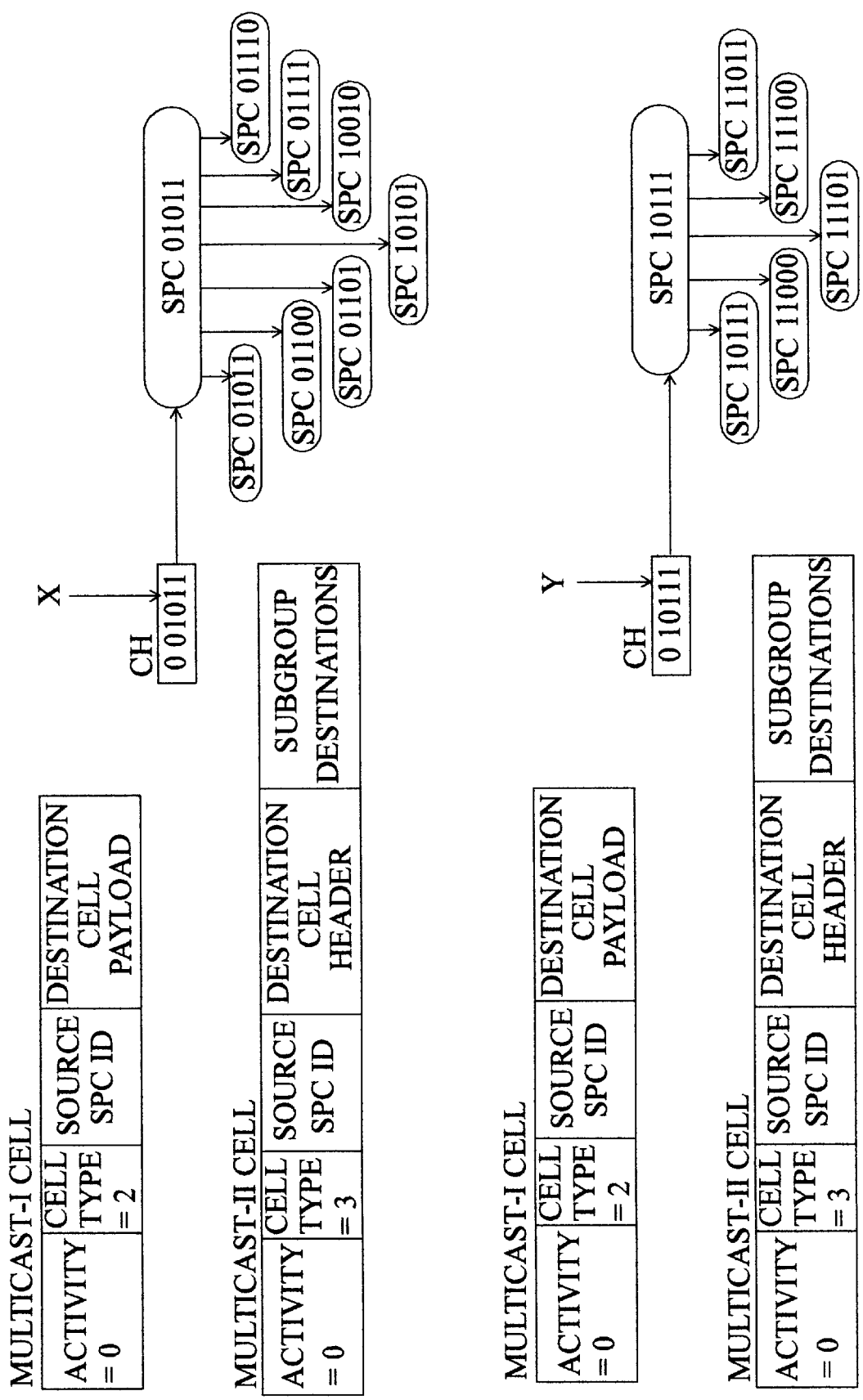

FIG. 6a and 6b are an example of multicast switching process. To look up the multicast subgroups for an incoming multicast cell, SPCs include a multicast LUT 61 containing entries 62 of quadruplet of n-bit size, n-bit offset, n-bit SPC number, and size-bit destination sequence. The n-bit size field specifies the number of bits contained in the destination sequence. The n-bit SPC number field identifies the SPC to which the associated multicast subgroup is sent. The n-bit offset field specifies the reference destination SPC number adding to the size-bit destination sequence for obtaining the actual destination SPC numbers. A '1' in the $j^{th}$ position of the size-bit destination sequence indicates that SPC (offset+j) belongs to the multicast subgroup. FIG. 5 shows how a 32-bit multicast group is partitioned into three multicast subgroups of sizes 11, 11, and 10 respectively. The SPC numbers were chosen arbitrarily to be the first member of the multicast subgroups. However, any one of the N SPCs can be selected according to the loading of the SPCs and other applicable criteria. In practice, it is more economical to choose a SPC from the same multicast subgroup.

In the cell receive path, a SPC receives an ATM cell 63 from a line device and determines that the cell is multicast after looking up the corresponding entry 64 in the unicast LUT 65 with cell type value equals 1. The destination SPC field becomes a pointer to the multicast LUT 61. The first entry pointed to contains the number of multicast subgroups S 66 followed by S entries of multicast subgroups 62, see the format of the subgroup entry in FIG. 5. For each of the multicast subgroup entries read, the SPC formats a CH 67 using the third field as the destination SPC and makes a request to the control IC, and formats a multicast-I cell 68 and sends it to the data path ICs in the switch transmit path. The format of the multicast-I cell is shown in FIG. 6a where the cell type field equals 2 and the source SPC id field contains the source SPC number together with a unique number for associating the multicast-II cell to the multicast-I cell. Immediately following the transmission of the multicast-I cell, the SPC formats a multicast-il cell 69 whose format is shown in FIG. 6a, and sends it to the same destination SPC as the multicast-I cell was sent to. A cell type field value of 3 identifies a multicast-II cell to the receiving SPC in the switch receive path. The destination cell header field contains the 4-octet cell header that all SPCs in the multicast group use for their outgoing cells. The subgroup destination field contains an n-bit size, n-bit offset, and size-bit destination sequence.

In the switch receive path, a SPC 610 receives and caches multicast-I cells. Upon an arrival of a multicast-II cell 69, the SPC compares the source SPC id to the cached ones to identify the corresponding multicast-I cell 68 (there must be one and only one match, or else an error has occurred). The SPC derives all the destination SPC numbers 611 using the subgroup destinations field contained in the multicast-II cell 69. With the derived destination SPC numbers, the SPC formats the CHs 612 and the corresponding switch cells, and makes requests sequentially to the control IC and sends cells to the data path ICs in the switch transmit path respectively. To preserve cell sequencing, the SPC will completely serve the earliest multicast-I/multicast-II request before serving the next earliest multicast-I/Multicast-II request.

This multicast function, similar to the U.S. Pat. No. 5,402,415, delegates cell replication to a selected group of SPCs. Unlike the method described in the U.S. Pat. No. 5,402,415, the present invention does not need to configure the lookup tables at the selected input ports, and consequently performs multicasting based solely on local decisions. In addition, unlike the method described in the U.S. Pat. No. 5,402,415, the present invention will not cause cells out of sequence.

Data Path IC

A data path IC has N 1-bit input ports, N 1-bit output ports, and one N-bit IntraBus. It comprises four parallel planes of banyan MINs for transferring up to four cells to a Data path IC Output Port (DOP) simultaneously. This configuration yields the optimal switch throughput since the performance gained from reducing blocking with more planes would be offset by the longer control time, as will be shown in the control IC section. It should be appreciated that other MINs and the number of parallel planes can vary, but the underlying switch architecture remains the same as would be apparent to those skilled in the art.

Figure 7:
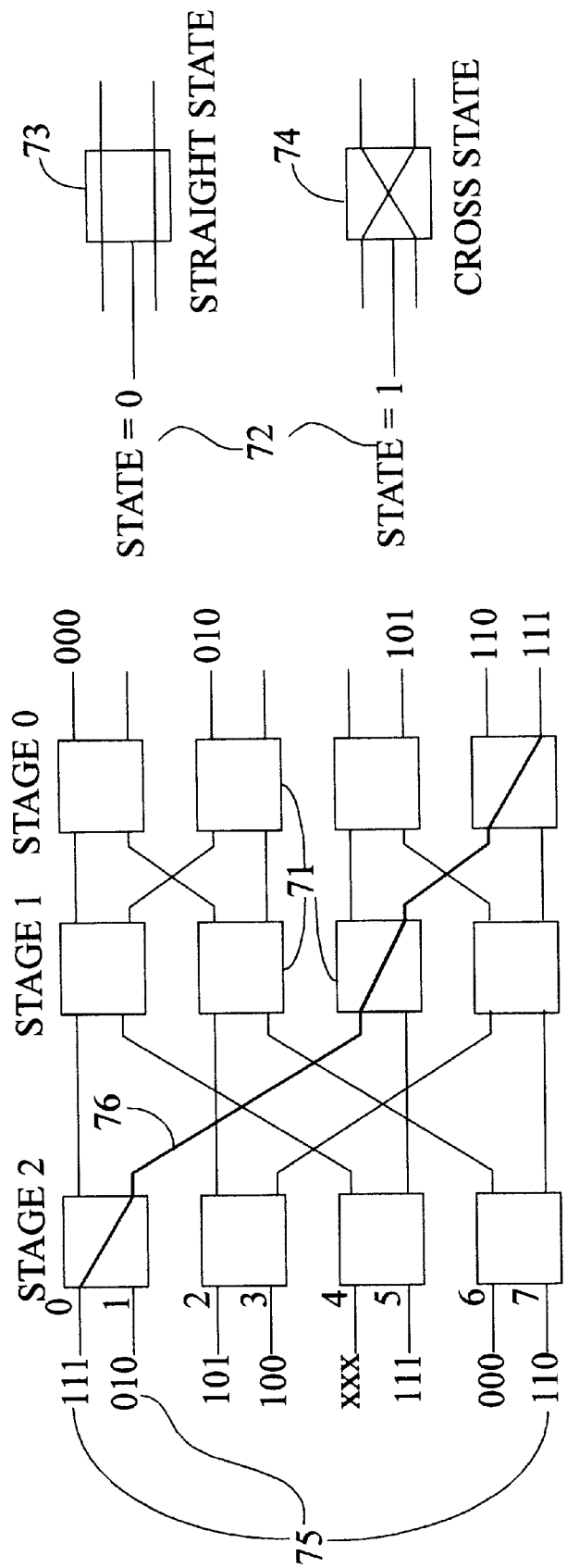
FIG. 7 is a diagram of 8×8 banyan multistage interconnection network.

FIG. 7 is an example of an 8×8 banyan MIN which comprises 3 (n=log$_2$N) stages of 2×2 SEs 71, with 4 SEs 71 per stage. The state of a SE, either straight or cross, is controlled by a state bit 72. A state bit 72 of '0' and '1' sets a SE to the straight 73 and cross state 74 respectively. A data path IC obtains these state bits from the control IC over the N-bit IntraBus to set up the physical paths connecting its input ports to output ports. The banyan MIN in the control IC application, however, uses the requested destination addresses 75 as the state bits. In particular, the left most and right most stage uses the msb and lsb of the destination addresses 75. 76 is an example of the setup path.

Figure 8:
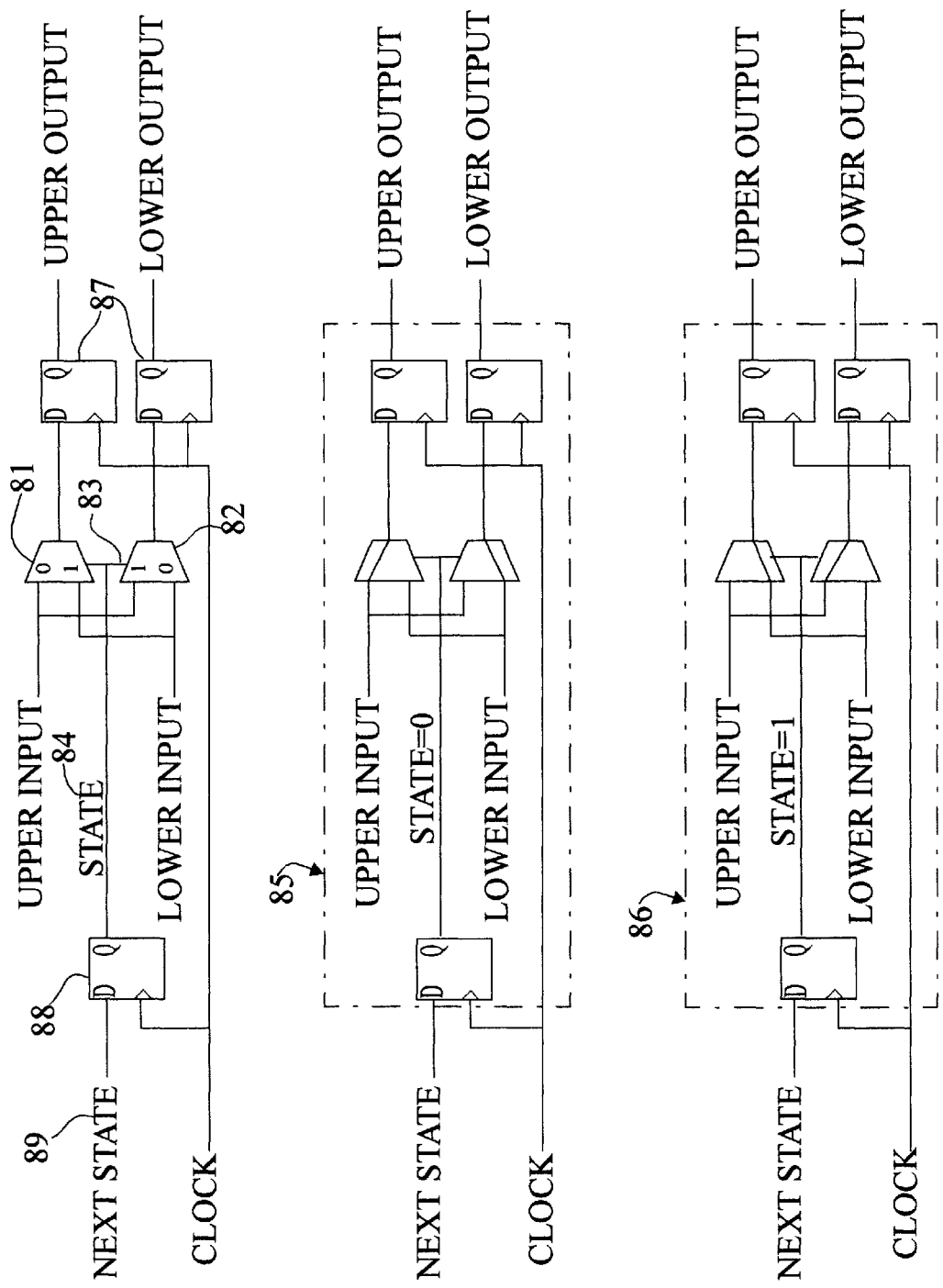
FIG. 8 is a diagram showing a switching element implementation in the data path IC.

FIG. 8 is an implementation of the SE in the data path IC which comprises an upper 2-to-1 mux 81 and a lower 2-to-1 mux 82 sharing a common select input 83 controlled by a state bit 84. A state bit 84 of '0' causes the upper mux to select the upper input as the upper output and causes the lower mux to select the lower input as the lower output, thereby causing the SE in straight state 85. Conversely, a state bit 84 of '1' causes the upper mux to select the lower input as the upper output and causes the lower mux to select the upper input as the lower output, thereby causing the SE in cross state 86.

To attain high clock rate, the SEs pipeline the data with a pair of flip-flops 87 connected to the output of the muxes. A third flip-flop 88 holds the present state bit 84 for the duration of the cell time and latches in a new state bit 89, obtained from the control IC over the IntraBus, right after the last bit of the cell. Hence, the desired data path is immediately available for the next cells resulting in a continuous train of cells shooting through the ATM cell switch fabric.

Figure 9:
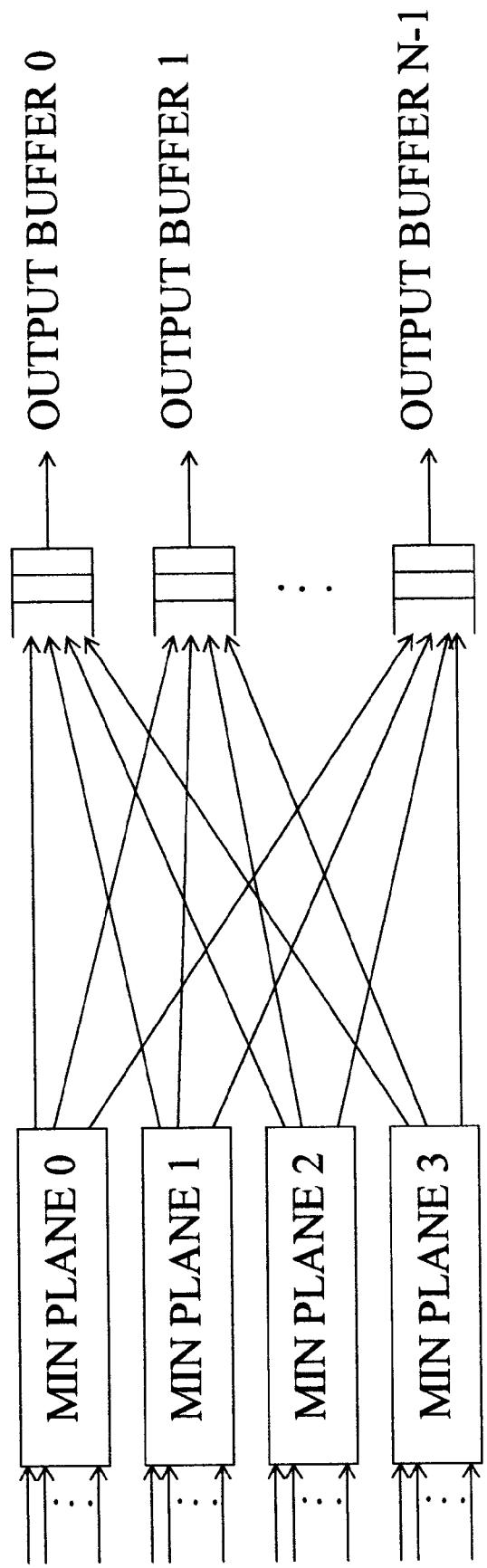
FIG. 9 is a diagram showing parallel MIN planes with output buffers.

Since one or more cells may reach the same DOP simultaneously over the parallel banyan MIN planes, each output port of each of the planes is equipped with an adequate amount of output cell buffer to maximize the number of cells reaching a DOP in a cell time, thereby attaining the target switch utilization. To share the four output cell buffers at any DOP and ensure cell sequencing, each DOP is equipped with a control logic to concatenate these buffers to form an effective single output FIFO. FIG. 9 is a diagram of a data path IC having the four output buffers corresponding to the four MIN plane output ports of any DOP shared to form an effective single output FIFO. As will be shown in the control IC section, a total buffer size of 16 cells per DOP yields an optimal throughput-cost ratio.

Control IC

Figure 10:
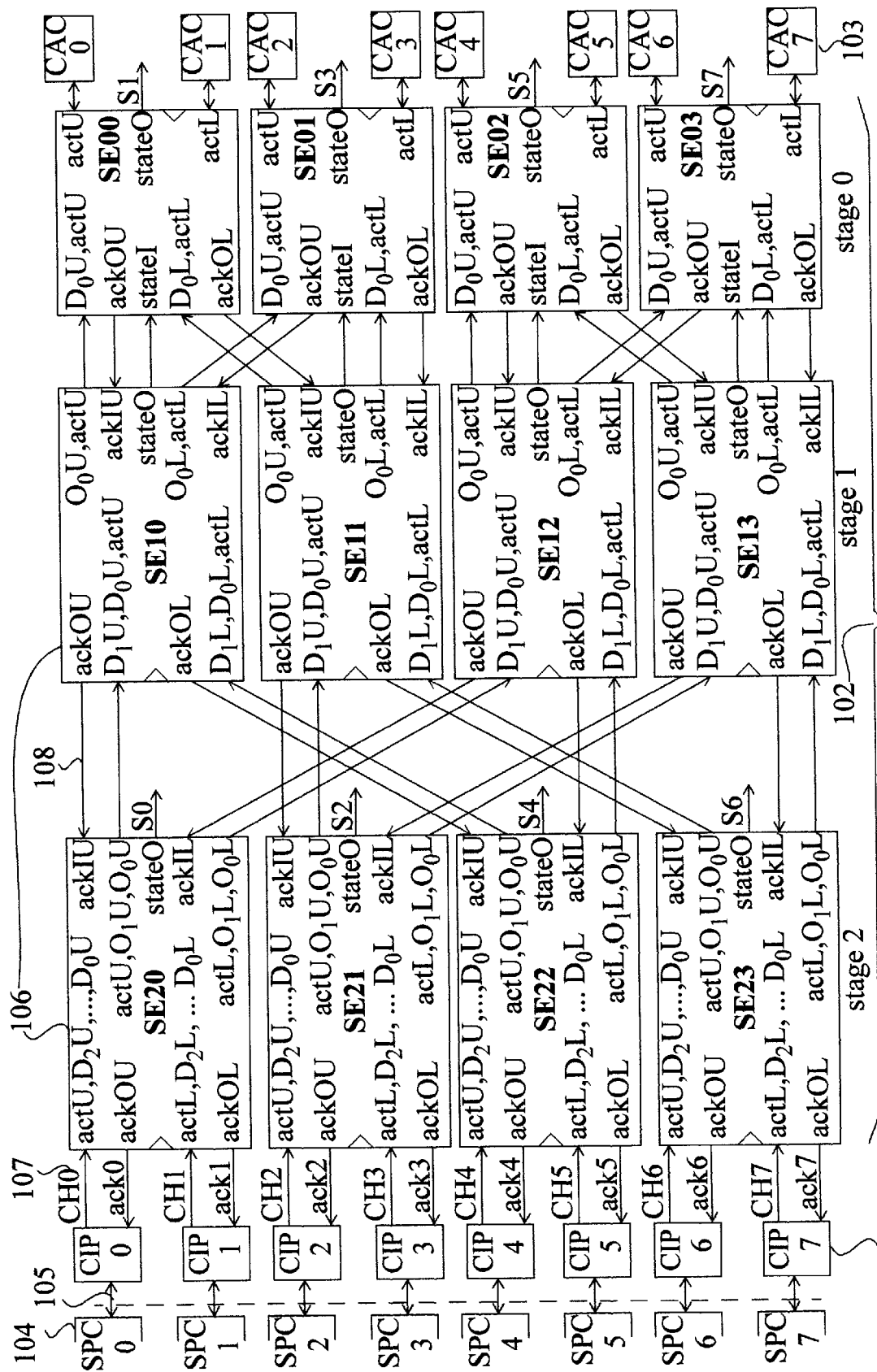
FIG. 10 is a diagram of control IC implementation.

FIG. 10 is a block diagram of an 8×8 (N=8) control IC implementation which comprises 8 Control IC Interface Ports (CIPs) 101, a MIN network 102 having the same structure as the data path ICs, and 8 Control IC Acknowledgment Controllers (CACs) 103. The CIPs 101 are identical and synchronous in executing operations, each of which connects to a SPC 104 by a bidirectional line 105 for receiving CHs and sending acknowledgments. Each CIP 101 has a CH queue for holding a small number of CHs, received from the attached SPC 104, waiting to be passed to the MIN 102 and an ack queue for holding the acknowledgment bits to be returned to the SPC 104.

The MIN 102 accepts CHs from the CIPs 101, resolves the state bits of the SEs 106, and sets up a reverse path leading back to the source as the CHs propagate through the MIN 102. A SE 106 sets its state bit according to its upper and lower input bit (each bit is part of the input CH) and enters into the appropriate state accordingly. If the input bits are distinct and active, then the SE 106 will set its state bit to a '0' and be in straight state if the upper bit is a '0', and sets its state bit to a '1' and be in cross state if the upper bit is a '1'. Conflicts occur if the input bits are the same and active, requiring the SE 106 to pick to connect one input to the output and block the other which decision can be fixed, random, or prioritized. The SE 106 then negatives the activity bit of the blocked CH in order to prevent it from interfering with other active CHs at subsequent stages.

To speed up the state resolution process, the control IC uses parallel lines between adjacent SEs 106 for transferring entire CHs from one stage to the next. Unlike continuous data which necessitates pipelining for high clock rate operations as in the data path ICs, the control IC needs no pipelining for its unaccompanied CHs resulting in purely combinatorial control path. It is this parallel combinatorial path that greatly speeds up the state resolution process, thus greatly reduces the control time.

A SE 106 in stage n−1 will receive, from its attached CIPs 101, two (n+1)-bit CHs (1 activity+n destination bits) simultaneously over the two parallel lines 107 of width n+1 bits connecting the CIPs 101 to the SE 106. The SE 106 then utilizes the activity bits and the most significant bits (msbs) of the destinations to set its state and at the same time removes the blocked CH by setting the corresponding activity bit to a '1', if any. Since SEs 106 in subsequent stages do not use these msbs, these bits are dropped from the CHs before being propagated to the next stage. A SE 106 in stage n−2 will receive, from its attached SEs 106 in stage n−1, two n-bit CHs (one activity+n−1 destination bits) simultaneously over the n parallel lines 108 connecting the SE 106 to the SEs 106 in n−1 stage. Using the received CHs, the SE 106 in stage n−2 sets the state, removes the blocked CH, drops the msbs from the CHs and propagate them to the next stage, and so on. As the CHs progress from input to output of the MIN 102, the size of the CHs is reduced by one bit every time they travel to the next stage. Hence only the activity bits can survive at the output of stage 0.

Each CAC 103 maintains a counter for keeping track of the number of cells in the corresponding DOP buffer. If the DOP buffer is full, the CAC 103 will reject cells and force them to be buffered at the source SPC by sending a negative acknowledgment back to the originating SPC. After the activity bits emerge from the output of stage 0, a CAC 103 will generate an acknowledgment bit of '0' if the DOP buffer is not full and the activity bit is a '0'; and generate a '1' otherwise. The resulting acknowledgment bits then ripple back to their originating CIPs over the reverse path.

Figure 11:
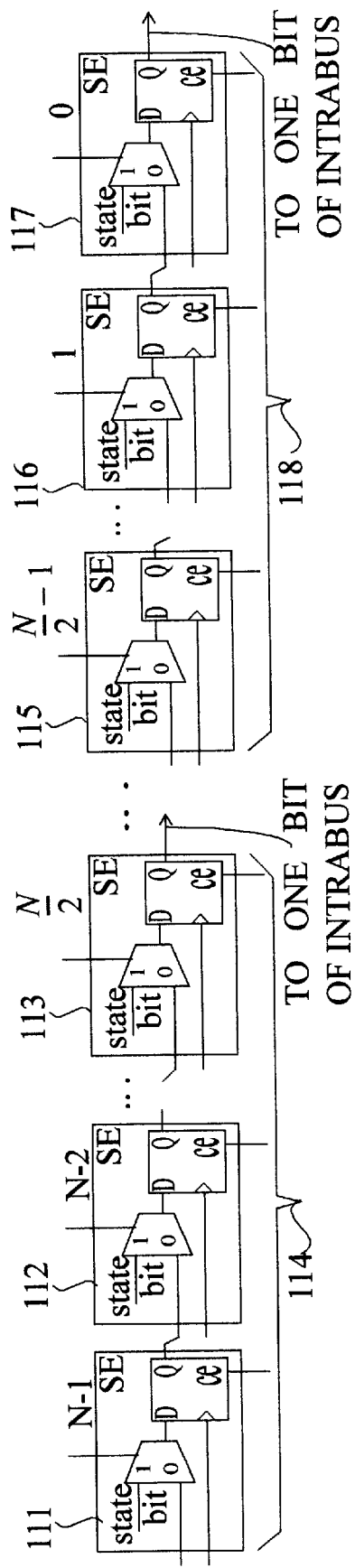
FIG. 11 is a diagram of switching element parallel-in-serial-out register implementation.

The SEs 106 belonging to a row of the MIN 102 participate in two parallel-in-serial-out registers, with each SE 106 containing one register stage, through which the state bits of the row SEs 106 shift out of control IC to the data path ICs over the IntraBus. The total number of such registers is N and hence the size of the IntraBus. FIG. 11 is a diagram of the parallel-in-serial-out register configuration within a row of SEs in a switch plane. In this configuration, the registers of row of SEs in stage N−1 111, stage N−2 112, . . . , stage $$\frac{N}{2}$$

113 are cascaded together to form a $$\frac{N}{2}\text{-stage}$$

parallel-in-serial-out register 114, while the registers of the same row of SEs in stage $$\frac{N}{2}-1$$

115, $$\frac{N}{2}-2$$

116, . . . , 0 117 are cascaded together to form a second $$\frac{N}{2}\text{-stage}$$

parallel-in-serial-out register 118.

Figure 12:
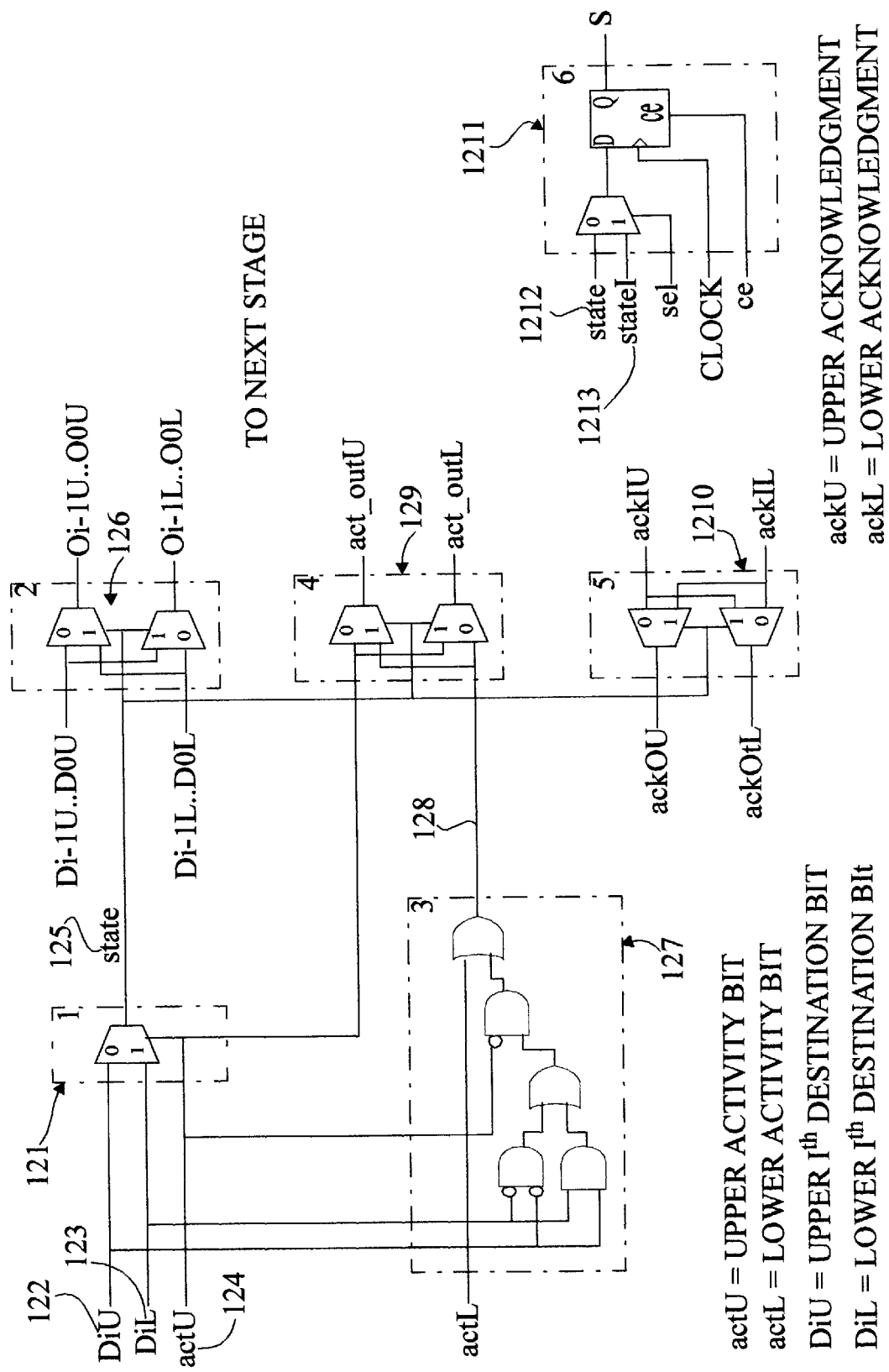
FIG. 12 is a diagram of a control IC switching element implementation.

FIG. 12 is a diagram showing a SE design in the control IC where the SE locates in stage i. Box 1 121 is a 2-to-1 mux that takes the most significant destination bit of the upper 122 and lower 123 CH from the $(i+1)^{th}$ stage as its upper and lower input bit respectively, and takes the activity bit 124 of the upper CH as its select input, thus giving priority to the upper CH. The output of Box 1 121 becomes the state bit 125 of the SE.

Box 2 126 takes the destination (with the msb stripped off) of the upper and lower CH from the $(i+1)^{th}$ stage as its upper and lower input respectively. It selects the upper and lower input as its upper and lower output respectively (straight state) if the state bit 125 is a '0', but selects the upper and lower input as its lower and upper output respectively (cross state) if the state bit 125 is a '1'.

Box 3 127 takes the activity and most significant destination bits of the upper and lower CH from the $(i+1)^{th}$ stage as its inputs and generates a new activity bit 128 replacing the one in the lower CH. Box 3 127 will block the lower CH by negating the lower activity bit if blocking occurs. Blocking occurs when both CHs are active and both most significant destination bits of the CHs are identical.

Box 4 129 takes the upper CH activity bit 124 from the $(i+1)^{th}$ stage and the newly generated lower CH activity bit 128 as its upper and lower input respectively. It selects the upper and lower input as its upper and lower output respectively if the state bit 125 is a '0', but selects the upper and lower input as its lower and upper output respectively if the state bit 125 is a '1'. The output of box 2 126 and box 4 129 together comprise the upper and lower output CHs of the SE which become the input of the SEs in the $(i-1)^{th}$ stage.

Box 5 1210 takes the upper and lower acknowledgment bit from the $(i-1)^{th}$ stage as its upper and lower input bit respectively. It selects the upper and lower input as it upper and lower output respectively if the state bit 125 is a '0', and selects the upper and lower input as its lower and upper output respectively if the state bit 125 is a '1'. The flow through box 5 1210 in every SEs of the control IC MIN constitute the reverse path over which acknowledgment propagates from stage 0 toward the originating SEs in the stage n−1.

Box 6 1211 comprises a 2-to-1 mux and a register. The mux takes the internally generated state bit 1212 (same as the state bit 125) and the state bit from the $(i+1)^{th}$ stage 1213 as its upper and lower input respectively. The mux selects the upper input for one clock cycle, thus placing the intemaly generated state bit 1212 in the register's output. The mux then selects the lower input for $$\frac{N}{2}$$

clock cycles, thus shifting the state bits from $(i+1)^{th}$ stage to $i^{th}$ stage to $(i-1)^{th}$ stage and eventually out from either $$\left(\frac{N}{2}\right)^{th}$$

stage or $0^{th}$ stage onto the IntraBus.

The time between the instants the CHs present to the input of stage n−1 and the acknowledgment returned to the CIPs is called a round. SPCs send and receive new cells, send CHs and receive acknowledgments once every four rounds, called a cell cycle. Operating over the combinatorial control path from stage n−1 to stage 0 and back to stage n−1 yields the shortest possible round. A round comprises mainly the sum of the propagation delays through the SEs. The propagation delay of a SE is the total number of 2-input gates on the longest path over which the control and acknowledgment data must traverse. Refer to FIG. 12, the longest path comprises box 3 127 of 4 gate levels, either box 2 126 or box 4 129 of 2 gate levels, and box 5 1210 of 2 gate levels, and thus a total of 8 2-input gate levels. A 32-port control IC implemented with a single FPGA has been shown to have 110 nsec round. Using an ASIC implementation with reasonable gate propagation delay of 400 psec, the round for a 256×256 control IC can easily be shortened to under 40 nsec yielding a cell cycle fast enough for OC-48 rate switching.

The control IC takes the advantage of the fast round to facilitate bypass queueing algorithm to achieve over 90% utilization. In the first round, the control IC allows each CIP an opportunity to compete for an output port for which the CIP uses the first CH in its CH queue. At the end of first round, every CIP receives and buffers the acknowledgment bit in its ack queue. The winning CIPs refrain from competing for output ports in subsequent rounds of the same cell cycle by sending CHs with activity bits set to '1' so as not to interfere with other requests because a SPC can only transmit and receive one cell per cell cycle. In the second round, the control IC allows the losing CIPs a second opportunity to compete for output ports for which the CIPs use the second CHs in the CH queues. Again the winning CIPs refrain from competing in third and fourth round.

At the end of the fourth round, the CIPs would have buffered a 4-bit acknowledgment which are returned to the SPCs. The bypass queueing algorithm ensures that at most one bit out of the 4 bits acknowledgment is a '0'; otherwise an error must have occurred. If a CIP finds a '0' bit in the 4-bit acknowledgment, then it purges the corresponding CH from its CH queue and is ready for accepting a new CH in the next cell cycle. Upon receiving the 4-bit acknowledgment from the CIPs, a SPC locates the '0' bit position, if any, and performs one of the followings. If there is a '0' bit in the 4-bit acknowledgment, then the SPC sends the corresponding cell to the data path ICs over the switch transmit path and sends a new CH to the control IC. If the 4-bit acknowledgment is of all ones, then the SPC keep the cell for the next cell cycle. At the end of each round, the control IC shifts the state values of the MIN SEs to the data path ICs over the IntraBus.

As long as the cell cycle is shorter than the cell transmission time (through the data path ICs), there will be no switch utilization degradation due to processing overhead. It should be noted that even though parallel physical MINs are used in a data path IC for carrying cells, the control IC needs only one MIN because of the time sharing of the control IC MIN. The following algorithm details the path setup and control procedures.

It should be appreciated that the number of rounds in a cell cycle attaining optimal utilization may vary depending on the type of MIN used, the number of parallel MIN planes, and possibly other criteria The Algorithm The control IC, data path ICs, and the SPCs execute the same operations for each cell cycle described below.

1. Every four rounds, each CIP receives a CH from the attached SPC and stores it in its CH queue.
2. Each CIP copies a CH from the CH queue to its stage n−1 input at which time a round commences.
3. A CAC accepts a request if the activity bit emerging from stage 0is a '0' (the CH has successfully made its way through the n stages of the MIN) and the corresponding DOP buffer is not full; otherwise the CAC rejects the request.
    3.a Upon accepting a request, the CAC keeps track of the corresponding DOP's output FIFO fill level by incrementing its counter by one. The CAC also indicates the acceptance by returning a positive acknowledgment bit of '0' to the source CIP along the reverse path.
    3.b Upon rejecting a request, the COP indicates the rejection by returning a negative acknowledgment bit of '1' to the source CIP along the reverse path.
4. At the end of the current round, the control IC latches the state values of the SEs to the N parallel-in-serial-out registers and shifts them out to the data path ICs over the IntraBus.
5. At the end of the current round, the CIPs receive the returned acknowledgment bits and store them in their respective ack queues.
6. During the next round belonging to the same cell cycle,
    6.a The negatively acknowledged CIPs contend for output ports by copying the next CHs in the CH queues to the stage n−1 inputs. However, if the next CHs request the same output ports as the current CHs, the CIPs would use the current CHs, instead of the next CHs to preserve cell sequencing,
    6.b The positively acknowledged CIPs refrain from contending for outputs by sending null CHs with the activity bit set to a '1' to the stage n−1 inputs. A new round commences.
7. Repeat steps 3 through 6 for a total of four times.
8. At the end of the fourth round, every CIP sends the acknowledgment bits from the ack queue to the attached SPC with which the SPC determines the winning cell to be sent through the data path ICs. Each of the data path ICs receives and stores up to four cells and releases at most one cell from its output buffer to the attached SPC during each cell cycle. The COPs decrement the nonzero COP counters by one to track the cell departure.

9. Repeat steps 1 through 8 for every cell cycle.

It should be noted that cell sequencing is an intricate property of the ATM cell switch fabric which sets up data path prior to actual cell transfer.

Figures 13, 14:
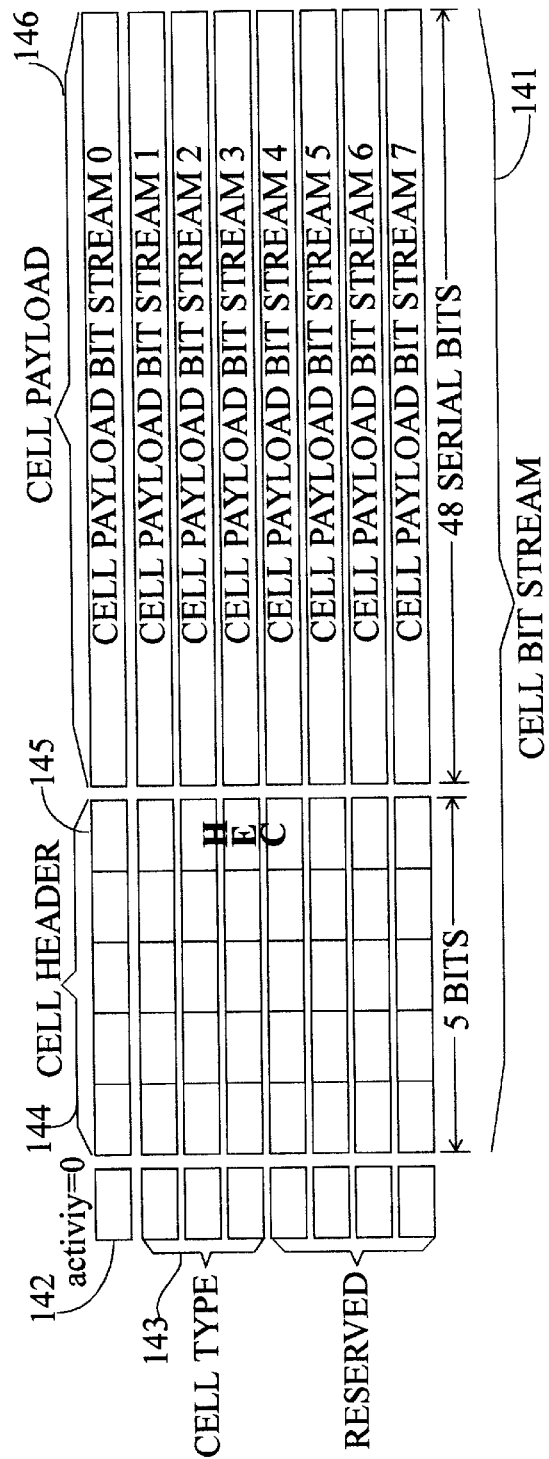
FIG. 13 is a table tabulating the computer simulation results of switch utilization as a finction of the number of parallel MIN planes and the size of the data path IC output buffers.
FIG. 14 is a diagram showing the format of the fault detection cell.

FIG. 13 is a table tabulating the computer simulation results of the switch utilization as a function of the number of parallel MIN planes and the total output buffer size of a DOP. From the table, a combination of four parallel banyan switch planes and 16-cell output buffer capacity per DOP yields the best cost-performance.

The switching element design shown FIG. 12 is such that the control IC favors some SPCs over the others due to SEs giving priority to the upper input when come to resolving conflicts. To ensure fairness among SPCs, a SE should neither favor the upper request nor the lower request. Even though the way priority is used in individual SE does not affect the throughput, higher packet loss rate would result in those SPCs that are given lower priority during contention resolution in the control phase. This in turn forces the SPCs to use a larger buffer than would be used in a fair system. One way that brings in complete fairness is that a SE selects the upper request and lower request as the winner with equal probability in case a conflict occurs. The drawback is that the SE needs a mechanism for selecting a winner which adds complexity to the design and consequently adds delays to the SEs. Another way that increases fairness with no change in the SE design described in this invention is to have two types of SEs, SEs that give priority to the upper request and SEs that give priority to lower request, distributed across a MIN plane, and thus moderate the worse case cell loss probability. Computer simulations show that for a 128×128 ATM switching system with 4 parallel switch planes, 16 cells output buffers, 20 cells input buffers, and running at 0.9*0.9%=81% utilization has virtually zero packet loss rate.

1:m Protection of Data Path ICs

The ATM cell switch fabric reserves extra capacity of one data path IC for 1 :m protecting the m working data path ICs. The protection is by means of a procedure executed by every SPC to detect and identify the failed data path IC, to automatically reroute traffic to the protection one, and report fault status to the management layer. The 1:m protection scheme works if no more than one data path IC fails. It is, however, unlikely that two or more data path ICs failures occur simultaneously, and thus with high probability the system will be able to recover within a short period of time after a fault is developed in one of the working data path ICs. If extreme reliability is required, the system may employ 2:m or higher protection scheme. To ensure the spare data path IC is available when needed, one or more SPCs will continuously monitor it for any failure and report immediately to the management layer. During the fault recovery period, there will be a brief disruption of normal cell flow until the affected stored cells in the data path IC output buffers are completely flushed out or a system reset is completed.

To facilitate fault detection, a SPC periodically dispatches Fault Detection Cells (FDCs) to other SPCs by which SPCs can determine if a fault has been developed and in which working data path IC. FIG. 14 shows an example of a FDC composing of eight parallel bit streams 141 carried by eight data path ICs. A FDC is a switch cell containing an activity bit 142 of 0, a cell type 143 value of 4, a normal 5-octet cell header 144 including the 1-octet header checksum (HEC) 145, and eight fixed payload bit streams 146. Once f seconds, every SPC formats a FDC and broadcasts it to the other N−1 SPCs, and once f seconds, every SPC would receive N−1 FDCs. Upon receiving a switch cell on the switch receive path, a SPC computes the HEC on the first four octets of the cell header 144, compares the result against the received HEC 145, and takes appropriate actions depending on the outcome described below.

In normal operating condition, the outcome will be a match for which the SPC assumes the cell is received intact. The SPC then discards the cell after determining that it is of FDC by the cell type 143 value.

In a faulty operating condition, the outcome will be a 'no match' for which the SPC suspects that a data path IC has failed. The SPC discards the cell if it is not a FDC. If the cell is a FDC, then the SPC compares the eight received 48-bit payload bit streams 146 to the pre-stored fixed 48-bit pattern and finds the failed data path IC as the one that carried the mismatched bit stream. After a number of mismatches has occurred, the SPC would declare the failure and switch from the failed data path IC to the protection one.

Another variant of the fault detection cell payload bit streams involves error control encoding of each bit streams so that a SPC needs only to compute the syndrome or check sum of each of the bit streams instead of comparing the bit streams to a fixed pattern.

Besides the purpose of fault detection, the periodic transmission of FDCs serves also as the heart beat with which a SPC uses to determine if other SPCs are on-line or off-line. For instance, if a source multicast SPC detects a delegated SPC goes off-line, then it must assign another SPC in the same multicast group, or any other SPC to perform the cell replication.

1+1 Protection of Control IC

The ATM cell switch fabric reserves extra capacity of one control IC for 1+1 protecting the working control IC. The protection shares the same procedure as in 1:m data path IC protection with the exception that if multiple bit stream mismatches occur for a number of times, a SPC would declare failure in the working control IC and switch to the protection one accordingly. This is because a failure in the control IC would cause multiple data corruptions across the data path ICs. During the fault recovery period, there will be a brief disruption of normal cell flow.

Port Expansion Configuration

Figure 15:
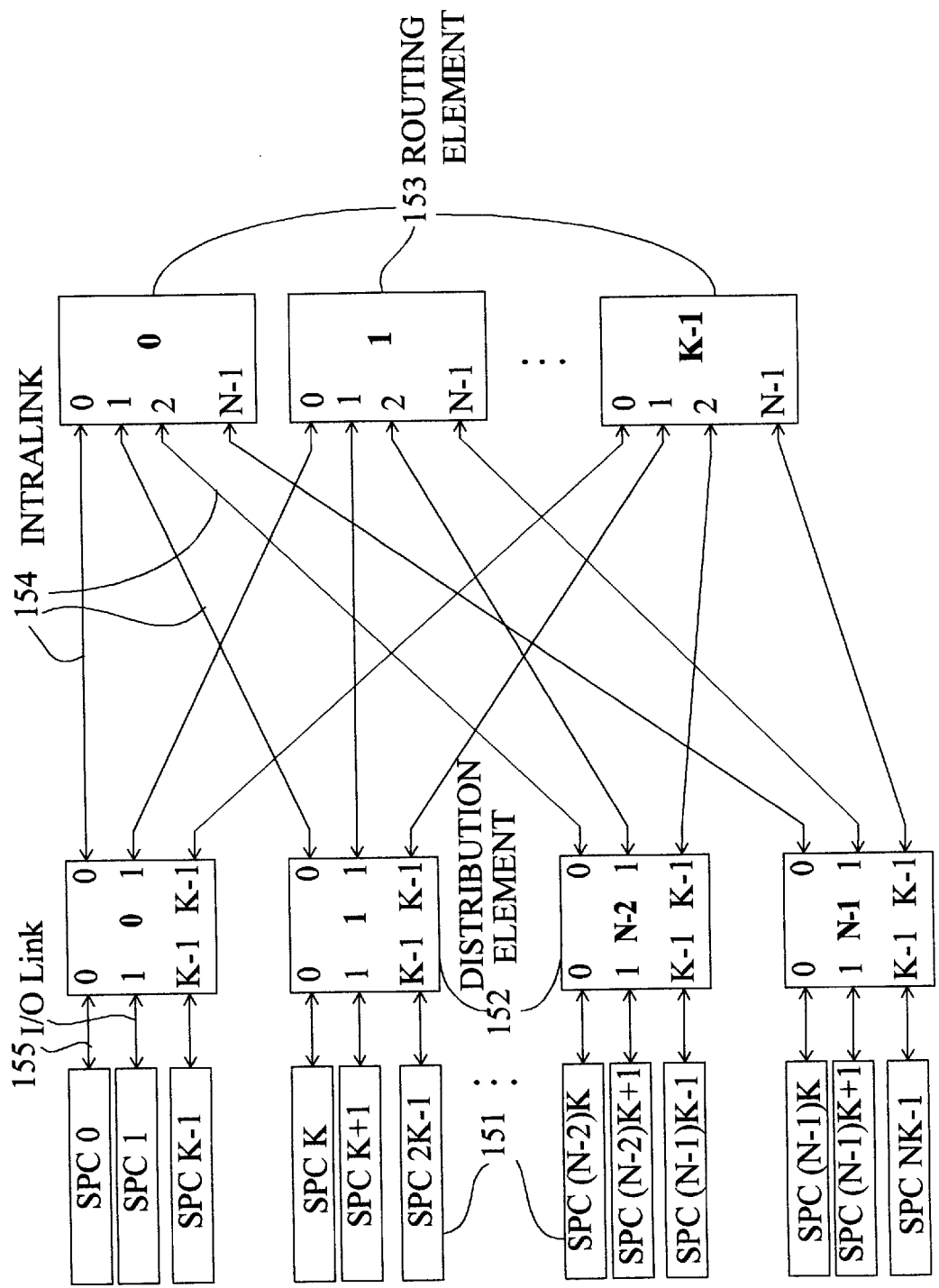
FIG. 15 is a diagram showing a two-stage port expansion configuration.

FIG. 15 shows the Port Expansion Configuration (PEC) which consists of a column of KN SPCs 151, a column of N 2K×2K Distribution Elements (DEs) 152, and a column of K N×N Routing Elements (REs) 153. A DE 152 communicates with all of the K REs 153 over K bidirectional IntraLinks 154; conversely, a RE 153 communicates with all of the N DEs 152 over N bidirectional IntraLinks 154. An IntraLink 154 has the same capacity as an I/O link 155 connecting a SPC 151 to a DE 152. The flow of a cell begins with a cell arrival to a source SPC 151. The source SPC 151 submits the cell to its attached DE 152 which in turn forwards the cell to one of the REs 153. The RE 153 then routes the cell to the destination DE 152 where the destination SPC 151 is found. Finally, the destination DE 152 routes the cell to the destination SPC 151. However, if the source and destination SPCs 151 of a call are on the same DE 152, then the DE 152 will route the cells of the call entirely within itself, not passing through any RE 153. Thus, on what follows, an output port of a DE means the output port attaching to an IntraLink, not to another SPC.

A RE 153 is any cell switch fabric capable of routing input cells to its output. A DE 152 is any cell switch fabric capable of routing input cells to its output with half of its I/O ports connected to K SPCs 151 and the other half connected to K REs 153. The control IC and data path ICs configuration described in this invention is suitable for both the distribution element and routing element implementation.

In the SPC-to-DE direction, all of the K SPCs 151 connecting to a DE 152 participate in distributing traffic evenly to the output ports of the DE 152. At call setup time, a source SPC 151 assigns a call to a path passing through an appropriate output port of the associated DE 152. Adhering to the per call based path selection and considering calls destined for the same DE 152, a SPC 151 assigns a call to the least busy DE output port so that the assigned load on the DE output ports at any given time differ by at most one call bandwidth for the traffic bounded to the same destination DE 152. As a result, the SPCs 151 achieve even traffic distribution among the DE output ports on a per call and per destination DE basis. The evenness of traffic distribution depends on the granularity of call bandwidth to the I/O line speed. It is expected that this ratio will be small, and especially true with high speed I/O lines, say 155 Mbps or higher. Nevertheless, the distribution of traffic is over K I/O lines and K DE output ports, the issue of uneven traffic distribution should not be of concern, especially for large K, say 64.

In the DE-to-RE direction, because the traffic load on the output ports of any particular DE 152 are the same, all of the REs 153 are receiving the same offered traffic load. In the RE-to-DE direction, a RE 153 routes the cells to the output ports where the destination DEs 152 are connected. In the DE-to-SPC direction, a DE 152 routes the cells to their respective destination SPCs 151. After the path of a call from a source SPC 151 to the destination SPC 151 is established at call setup time, the cells belonging to the same call will traverse the same path for the duration of the call. Since path selection is on a per call basis, cells of the same call will reach the destination SPC 151 in the same order as they arrived to the source SPC 151 and thus cell sequence integrity is preserved.

Figure 16:
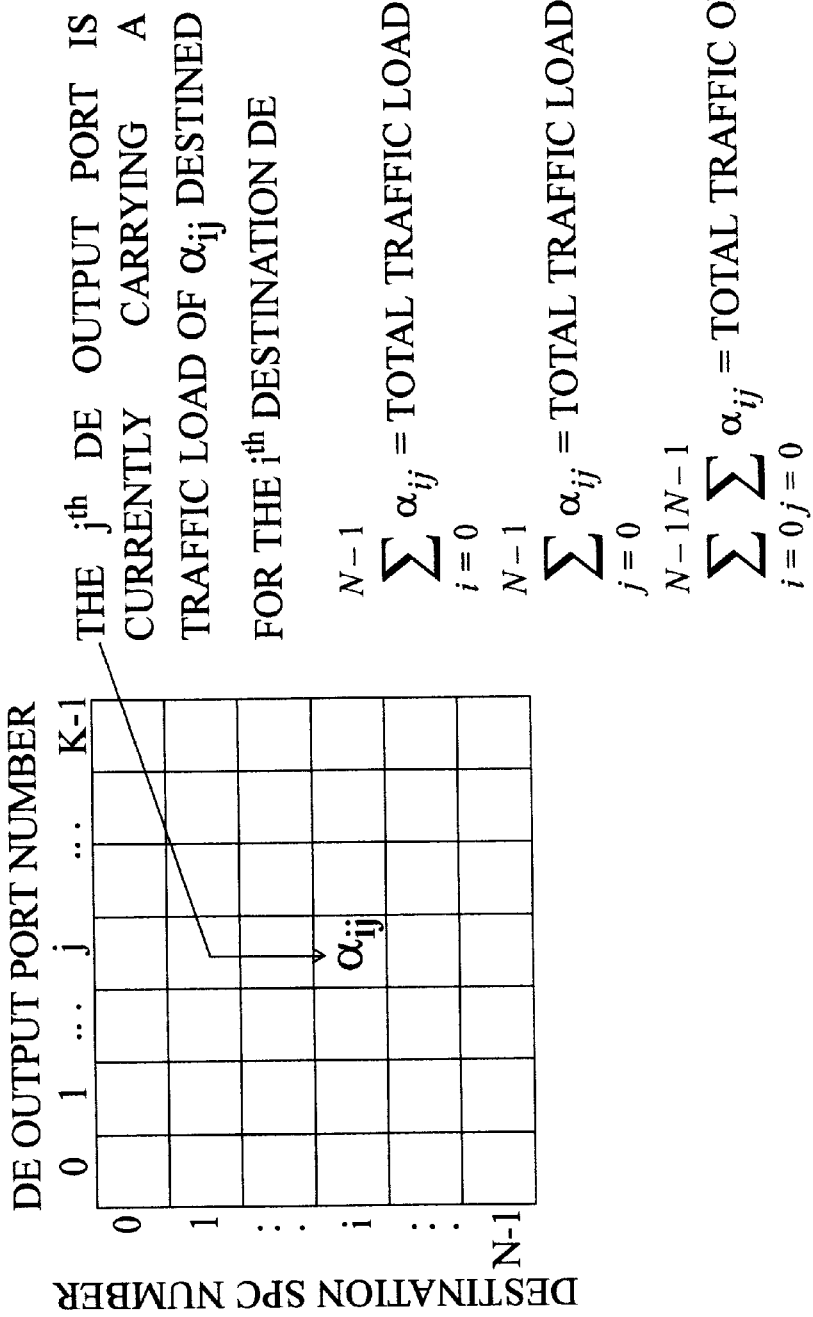
FIG. 16 is a diagram showing the N×K traffic matrix for use in the port expansion configuration.

To facilitate traffic distribution, every DE 152 keeps an N×K traffic matrix whose (i,j) entry records the amount of traffic sent out on the $j^{th}$ output port to the $i^{th}$ destination DE 152 as shown in FIG. 16. During a call setup, a SPC 151 reads all K entries from the row corresponding to the destination DE 152, and assigns the connection to the output port having the least traffic load. The SPC 151 then adds the requested traffic load to the entry corresponding to the selected output port, and writes back the modified entry to the traffic matrix. The selection of output port and the traffic matrix update requires K reads and one write, a total of K+1 memory accesses. Similarly, during a call release, the SPC 151 reads the corresponding entry, subtracts the released traffic load from the entry, and writes the modified entry back to the traffic matrix.

Based on the assumption of even traffic distribution among the K DE 152 output ports, the resulting PEC will attain 100% utilization provided that the DEs 152 and REs 153 are of 100% utilization. The following gives a simple mathematical prove for this claim. Since every DE 152 output port handles the same traffic load, it is sufficient to focus on one output port (or IntraLink). Let $L_{ij}$ =Traffic load, originated from the $i^{th}$ DE 152, destined for the $j^{th}$ destination DE 152, i=0, 1, . . . , N−1, j=0, 1, . . . , N−1. Then the traffic load on an IntraLink 154 destined for the $j^{th}$ destination DE 152, denoted $\beta_{ij}$, is given below.

$$\beta_{ij} = \frac{L_{ij}}{K}, i = 0, 1, \ldots, N-1, j = 0, 1, \ldots, N-1.$$

The total offered load, $T_j$, to a RE 153, destined for the $j^{th}$ destination DE 152 is $$T_j = \sum_{i=0}^{N-1} \beta_{ij} = \sum_{i=0}^{N-1} \frac{L_{ij}}{K}, j = 0, 1, \ldots, N-1.$$

$T_j$ must be less than 1 since $$\sum_{i=0}^{N-1} L_{ij}$$

is the total traffic across the $j^{th}$ destination DE 152 which must be less than K (since there are K I/O lines 155 each of which has a capacity of 1). Because for every $T_j$, there is an IntraLink 154 connecting the RE 153 to the $j^{th}$ DE 152, a RE 153 is able to handle the maximum possible traffic routed through it.

Figure 17:
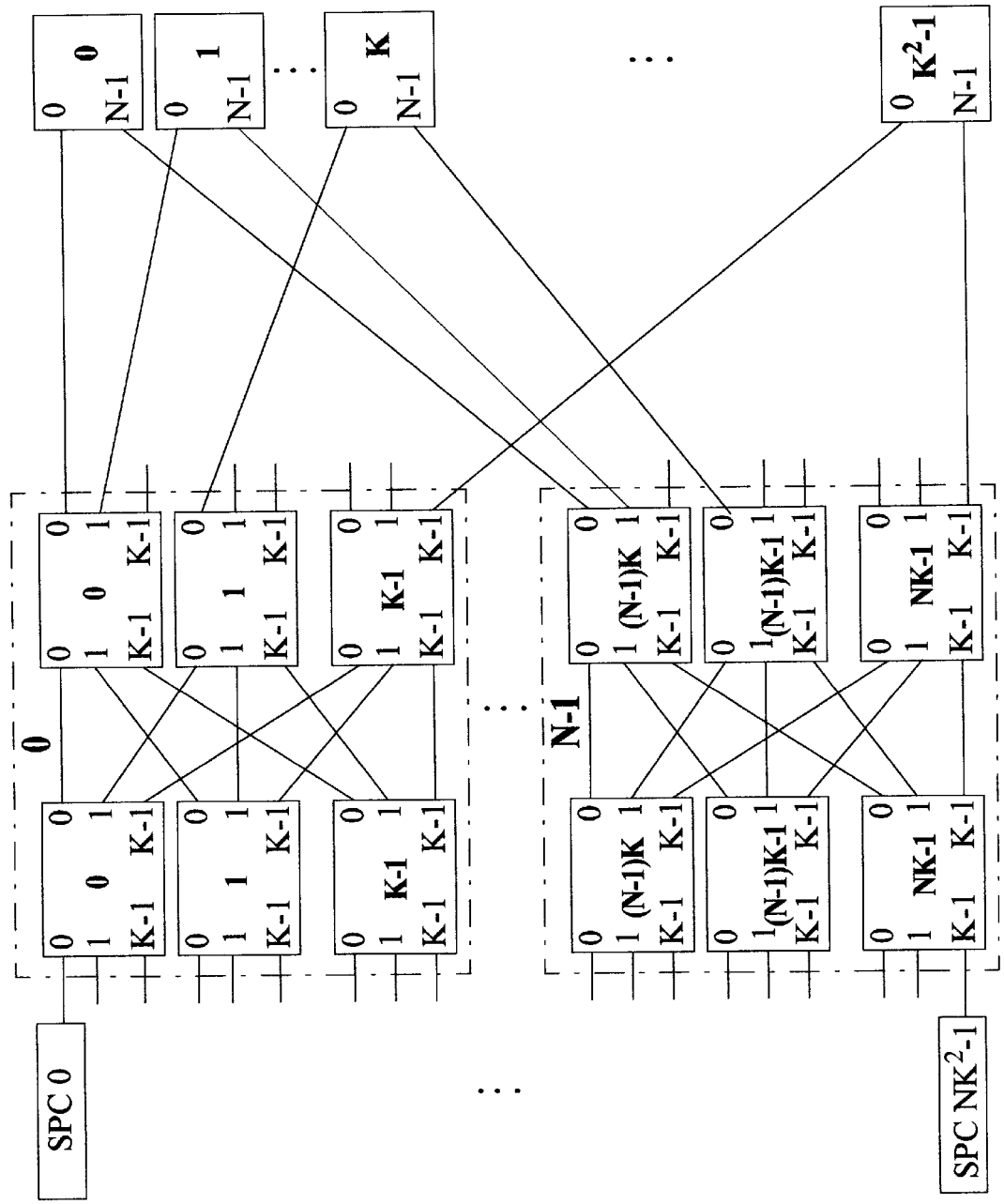
FIG. 17 is a diagram showing a three stage-port expansion configuration.

The method of port expansion can be extended to construct a Very Large scale Cell Switch (VLCS) by applying the two-stage configuration repeatedly to form a three or more stage configuration. FIG. 17 shows a VLCS having a three-stage configuration which can be viewed as a two-stage configuration with the first stage being made up of large two-stage switch fabrics. If a single N×N CSF is used throughout an h-stage configuration, then the maximum achievable port count is $$N\left(\frac{N}{2}\right)^{h-1},$$

and the number of CSFs used is $$(2h-1)\left(\frac{N}{2}\right)^{h-1}.$$

The ratio of port count CSF count is $$\frac{N\left(\frac{N}{2}\right)^{h-1}}{(2h-1)\left(\frac{N}{2}\right)^{h-1}} = \frac{N}{2h-1}.$$

Figure 18:
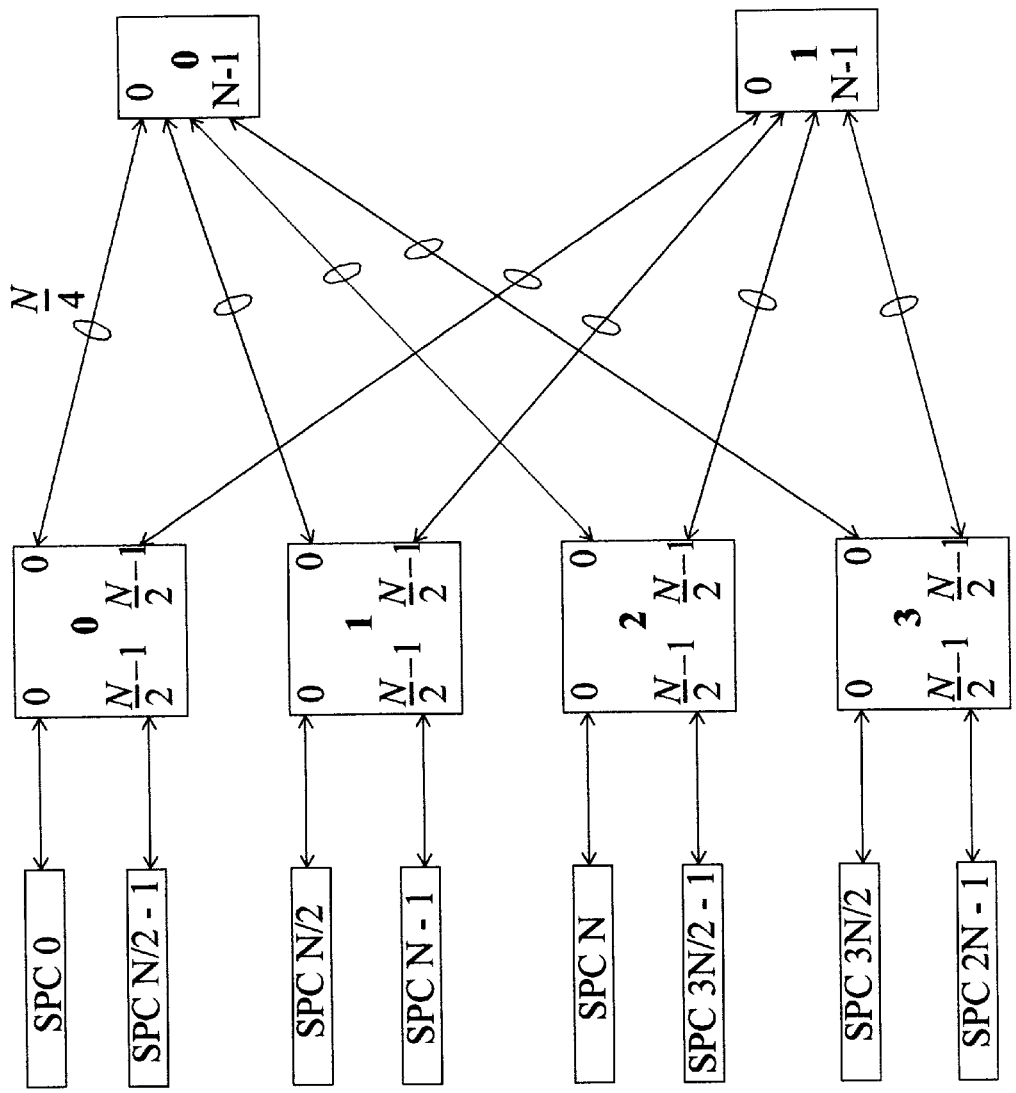
FIG. 18 is a diagram showing an example of two-times, two-stage port expansion configuration.

The interpretation of this ratio is that an h-stage configuration requires 2h−1 times amount of hardware as would be required if it is of single stage. In order to restrain the hardware cost, the number of stages employed must be kept low. The requirement of meeting the target port count of a VLCS and restraining the hardware cost command a CSF of size as large as possible. For example, let the CSF be of size 256×256 and of 2.4 Gbps per port, such as the one described in this invention, a two-stage, three-stage, and four-stage VLCS yields 32 thousand, 4 million, and half a billion ports respectively and yields half a million, 64 million, and 8 billion OC-3 rate user ports respectively. FIG. 18 shows a two-stage 2N×2N PEC constructed out of four N×N DEs and two N×N REs, a total of six CSFs which obeys the ratio of port count to CSF count. The IntraLink connecting a DE to a RE consists of $$\frac{N}{4}$$

lines, instead of a single line in a fully expanded two-stage PEC as in FIG. 15. Hence, the PEC allows a graceful upgrade of port count up to the maximum offered by a fully expanded PEC.

Because traffic tends to be localized, the actual load on an IntraLink utilization is likely to be significantly less than unity depending on the particular traffic patterns. This in turn strengthens the low delay and low congestion performance in the routing elements which contributes further to making the PEC a high performance ATM cell switching solution. It is important to emphasize that the multicasting methodology described in this invention is wholly applicable to the PEC because multicasting is carried out by SPCs, independent of the underlying switch architecture.

As a PEC application example, a three-stage VLCS can be deployed as a nation-wide ATM network infrastructure with the third stage CSFs serving as the crossconnect switches, the second stage CSFs serving as the central office switches, and the first stage CSFs serving as the campus or building switches. By placing crossconnect and central office switches in several different physical locations, fault tolerance can be achieved by re-routing traffic around damaged crossconnect or central office switches. Adding a fourth stage CSFs interconnecting different national ATM networks together, an international ATM network infrastructure is realized.

It should be appreciated that the size and number of the distribution elements and routing elements, and the number of stages in the port expansion configuration are chosen to satisfy the requirement of the particular applications as would be apparent to those skilled in the art.

Speed Expansion Configuration

Figure 19:
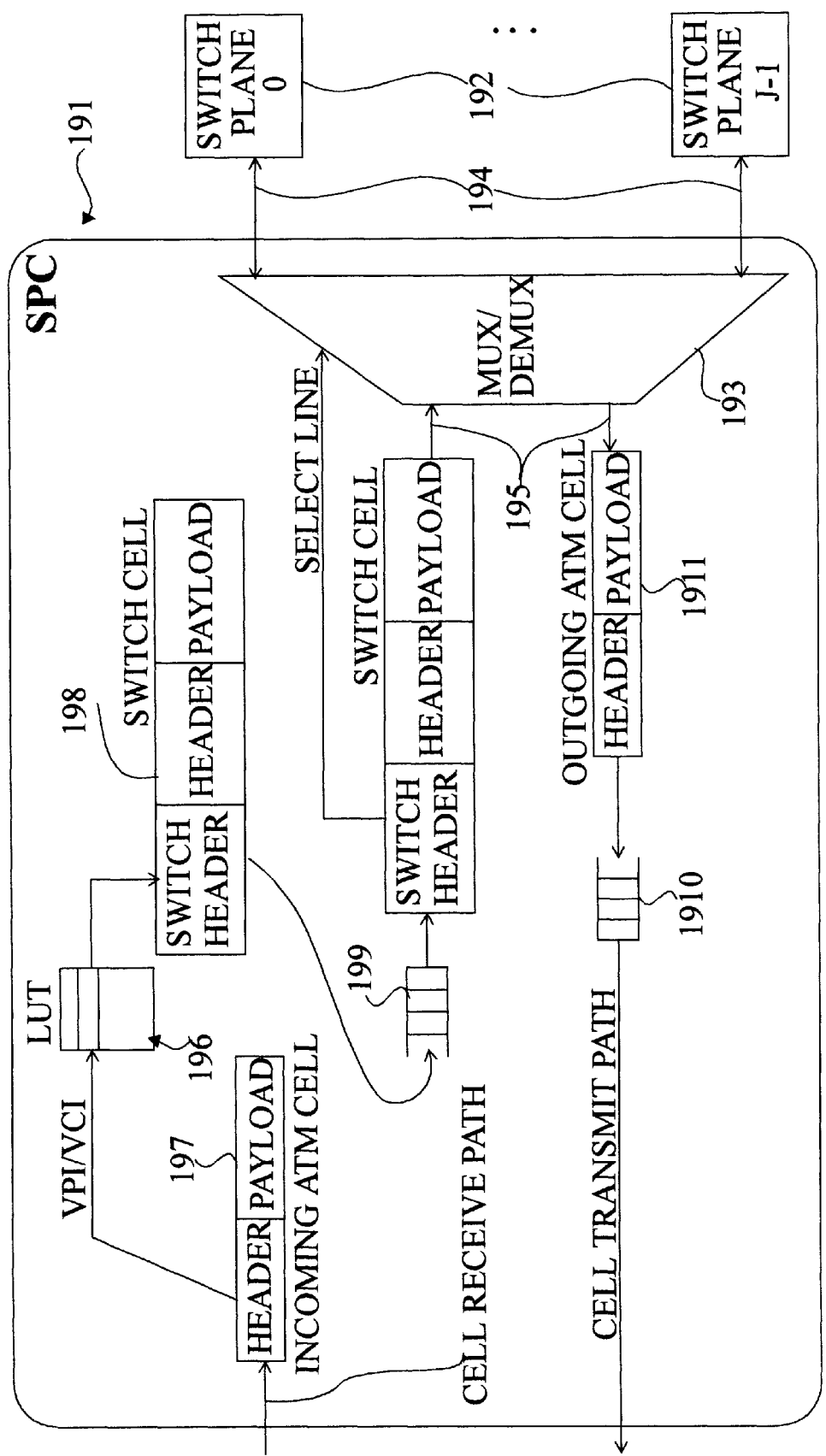
FIG. 19 is a diagram showing the speed expansion configuration.

FIG. 19 shows the Speed Expansion Configuration (SEC) which comprises a SPC 191 connecting to J identical switch planes 192. The SPC 191 comprises a multiplexer and demultiplexer (mux/demux) 193 for concentrating J bidirectional lines 194 to a bidirectional high speed line 195, a LUT 196 for looking up the switch header and the new cell header of an incoming cell 197 to form a switch cell 198, an input FIFO 199 for storing the switch cells 198, an output FIFO 1910 for storing the outgoing cells 1911. The call setup procedure assigns cells of a call to the same switch plane carrying the least traffic load. This way cells belonging to the same call will traverse the same switch plane and thereby preserving cell sequencing, and traffic load on the switch planes will differ by at most one call bandwidth and thereby accomplishing uniform distribution of traffic among the switch planes.

In the cell receive path, upon receiving a cell, the source SPC 191 use the VPI/VCI as the pointer to the LUT 196 to retrieve the corresponding switch header and outgoing cell header. In addition to the activity bit field and cell type field, the switch header also contains the mux/demux 193 select line information indicating which switch plane 192 to carry the switch cell 198 and the routing information by which a switch plane 192 routes the switch cell 198 to the destination SPC. The outgoing cell header contains the new VPI/VCI translated from the received VPI/VCI.

In the cell transmit path, the mux/demux 193 may output up to J cells 1911 at the same time which are buffered in the output FIFO 1910 before being transmitted out onto the line.

Now that the invention is being fully disclosed, there are various changes, modifications, and additions which may be brought about to the invention as would be apparent to those skilled in the art. It should be understood that the invention is limited only by the scope of the claims as set forth herein.

What is claimed is:

1. An ATM switching system comprising:
    a plurality of switch port controllers, each of said switch port controllers having a plurality of input/output ports on the user side and a plurality of input/output ports on the switch side, said switch port controllers including means for exchanging switch cells over said switch side, and
    a plurality of data path ICs, each of said data path ICs having a plurality of inputs and a plurality of outputs, said data path ICs include means for providing physical paths connecting said switch port controllers, and
    a control IC, said control IC comprising a multistage interconnection network, said multistage interconnection network having a plurality of bidirectional lines and unidirectional lines, said multistage interconnection network further having a combinatorial parallel path between adjacent switching elements to propagate entire control headers across said multistage interconnection network, to thereby greatly shorten the control time, said control IC further including means for resolving connection requests and means for setting up said connections between said switch port controllers.

2. The ATM switching system of claim 1 wherein said exchanging means in said switch port controllers includes sending control headers to said control IC over said bidirectional lines and receiving acknowledgments from said control IC over said bidirectional lines, sending said switch cells via said data path ICs to destination said switch port controllers and receiving said switch cells via said data path ICs from source said switch port controllers, and means for generating said control headers and said switch cells.

3. The ATM switching system of claim 1 wherein said physical means comprises a plurality of internal multistage interconnection networks, each of said internal multistage interconnection networks provides a path for individual said switch cell to reach said destination switch port controller, to thereby provide a plurality of paths for a plurality of said switch cells to reach said destination switch port controller simultaneously.

4. The ATM switching system of claim 3 wherein said internal multistage interconnection networks obtain switching element states from said control IC over said unidirectional bus linking said control IC to said data path ICs, to thereby set up paths within said data path ICs for said switch port controllers to exchanging said switch cells.

5. The ATM switching system of claim 4 wherein said multistage interconnection network plane of said data path IC comprises a plurality of switching elements, each of said switching elements comprises a 2-to-1 multiplexer pair, said 2-to-1 multiplexer pair having an output register pair and further having a select line controlled by said switching element state held in a third register.

6. The ATM switching system of claim 1 wherein said setup means of said control IC comprises a plurality of parallel-in-serial-out registers, said parallel-in-serial-out registers shift out said control IC switching element states to said data path ICs over said unidirectional bus.

7. The ATM switching system of claim 1 wherein said resolving means of said control IC includes a plurality of control header queues, a plurality of acknowledgment queues, and a plurality of acknowledgment controllers, comprising the steps of:
    Reserving the first said internal multistage interconnection network of said data path ICs for the winning said switch port controllers in the first round to send said switch cells to said destination switch port controllers, and Granting the losing said switch port controllers in said first round a second opportunity to compete for said destination switch port controllers, and reserving the second said internal multistage interconnection network of said data path ICs for the winning said switch port controllers in the second round to send said switch cells to said destination switch port controllers, and Granting the losing said switch port controllers in said first round and said second round a third opportunity to compete for said destination switch port controllers, and reserving the third said internal multistage interconnection network of said data path ICs for the winning said switch port controllers in the third round to send said switch cells to said destination switch port controllers, and Granting the losing said switch port controllers in said first round, said second round, and said third round a fourth opportunity to compete for said destination switch port controllers, and reserving the fourth said internal multistage interconnection network of said data path ICs for the winning said switch port controllers in the fourth round to send said switch cells to said destination switch port controllers.

8. The ATM switching system of claim 7 wherein said acknowledgment controllers set said acknowledgment bits to a '0' if the activity bits of said control headers exiting from the last said stage of said control IC multistage interconnection network are active and output buffers of said data path ICs is not full, and said acknowledgment bits are set to a '1' otherwise.

9. The ATM switching system of claim 7 wherein said control IC multistage interconnection network includes interspersing said switching elements having priority given to upper input and said switching elements having priority given to lower input, to thereby moderate the requirement of input buffers for achieving a given level of cell loss rate.

10. The ATM switching system of claim 1 wherein said control IC switching element comprises:

a 2-to-1 multiplexer for generating said switching element state, and a logic for removing blocked said control header by setting said activity bit of said blocked control header to a '1', and a plurality of 2-to-1 multiplexer pairs for straight connecting said control headers if said switching element state is a '0' and cross connecting said control headers if said switch element state is a '1', and a 2-to-1 multiplexer pair for providing a reverse path for said acknowledgments to travel backward to said source switch port controllers.

11. The ATM switching system of claim 1 wherein said ATM switching system includes a substantial number of redundant data path ICs for protecting working said data path ICs, comprising the steps of:

a dispatching fault detection cells periodically by said switch port controllers to said switch port controllers, said fault detection cells having payload bit stream patterns selected from the group consisting of fixed pattern payload bit streams and error control encoded bit streams, said switch port controllers perform error detection on each of said bit streams, and declaring one of said data path ICs in fault after a plurality of errors occur in the same said data path IC, and switching from said faulty data path IC to said redundant data path IC by said switch port controllers.

12. The ATM switching system in claim 1 wherein said ATM switching system further includes a redundant control IC for 1+1 protecting working said control IC, comprising the steps of:

dispatching said fault detection cells periodically by said switch port controllers to said switch port controllers, and declaring said working control IC in fault after a plurality of errors occur in two or more said fault detection cell payload bit streams, and switching from said faulty control IC to said redundant control IC by said switch port controllers.

13. A method for implementing multicasting in an ATM switching system having a plurality of inputs and a plurality of outputs, comprising the steps of:

partitioning a multicast group into multicast subgroups at call setup time by a source switch port controller, and selecting one switch port controller for representing each of said multicast subgroups at call setup time by said source switch port controller, and sending destination addresses contained in each of said multicast subgroups and the source multicast cell to said selected switch port controllers by said source switch port controller, to thereby delegate multicasting to said selected switch port controllers, and replicating and sending switch cells to destination switch port controllers by each of said selected switch port controllers specified by received said multicast subgroup destination addresses and received said multicast cell, to thereby achieving multicasting.

14. A two-stage port expansion configuration comprising a plurality of distribution elements connecting to a plurality of switch port controllers and a plurality of routing elements, each of said switch port controllers having a plurality of input/output ports on the user side and a plurality of input/output ports on the switch side, said switch port controllers including means for exchanging switch cells over said switch side, each of said distribution elements includes means for distributing traffic, coming from a plurality of said source switch port controllers, evenly among a plurality of said routing elements on a per said destination distribution element basis, to thereby avoid overloading of links between said routing elements and said distribution elements.

15. The two-stage port expansion configuration in claim 14 wherein path selections from source said switch port controllers to source said distribution elements, through said routing elements to destination said distribution elements, and then to destination said switch port controllers are on a per call basis, to thereby preserve cell sequencing.

16. The two-stage port expansion configuration in claim 14 wherein said distribution means includes a traffic matrix stored in each of said distribution elements, entries of said traffic matrix record the current traffic load for each of the output ports of said distribution element and separately for each of said destination distribution elements, comprising the steps taken by said switch port controllers of:

retrieving row elements of said traffic matrix corresponding to requested said destination distribution element during a call setup, and selecting the least loaded said output port corresponding to the smallest said row element as the path to said routing element, and adding requested traffic load to said selected row element and writing back the updated said selected row element to said traffic matrix, and retrieving the element of said traffic matrix corresponding to a released call, subtracting the released traffic load of said released call from said element, and writing back updated said element to said traffic matrix during a call release.

17. The two-stage port expansion configuration in claim 14 wherein said distribution elements and said routing elements are added incrementally to said two-stage port expansion configuration, to thereby increase the port count by an integer multiple of a base number equaling half the number of ports in a distribution element.

18. A speed expansion configuration comprising a plurality of switch port controllers connecting to a plurality of identical switch planes, each of said switch port controllers includes a multiplexer/demultiplexer for concentrating traffic from said switch planes and distributing traffic evenly to said switch planes, each of said switch port controllers further assigns a call to the least loaded said switch plane at call setup time and sends cells in sequence belonging to said call to said selected switch plane.

* * * * *